US012701440B2

(12) United States Patent
Karampatsis et al.

(10) Patent No.: US 12,701,440 B2
(45) Date of Patent: Aug. 4, 2026

(54) NETWORK ANALYTICS-BASED ACTION

(71) Applicant: Lenovo (Singapore) Pte. Ltd., New Tech Park (SG)

(72) Inventors: Dimitrios Karampatsis, Ruislip (GB); Apostolis Salkintzis, Athens (GR); Ishan Vaishnavi, Munich (DE); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 427 days.

(21) Appl. No.: 18/260,227

(22) PCT Filed: Dec. 31, 2020

(86) PCT No.: PCT/EP2020/088081
§ 371 (c)(1),
(2) Date: Jun. 30, 2023

(87) PCT Pub. No.: WO2022/144087
PCT Pub. Date: Jul. 7, 2022

(65) Prior Publication Data
US 2024/0073709 A1 Feb. 29, 2024

(51) Int. Cl.
*H04W 24/04* (2009.01)
*H04L 41/5009* (2022.01)
(52) U.S. Cl.
CPC ......... *H04W 24/04* (2013.01); *H04L 41/5009* (2013.01)
(58) Field of Classification Search
CPC .... H04W 24/04; H04W 24/02; H04L 41/5009
See application file for complete search history.

(56) References Cited

U.S. PATENT DOCUMENTS

| | | | |
|---|---|---|---|
| 11,051,192 B2 * | 6/2021 | Li | G06Q 20/382 |
| 11,432,174 B2 * | 8/2022 | Shariat | H04W 24/10 |

(Continued)

FOREIGN PATENT DOCUMENTS

| | | | | |
|---|---|---|---|---|
| EP | 3843333 A1 * | 6/2021 | ......... | H04L 41/0894 |
| WO | WO-2021019498 A1 * | 2/2021 | ............. | H04L 41/14 |

(Continued)

OTHER PUBLICATIONS

PCT/EP2020/088081, "Notification of Transmittal of the International Search Report and the Written Opinion of the International Searching Authority, or the Declaration", International Searching Authority, Oct. 4, 2021, pp. 1-20.

(Continued)

*Primary Examiner* — Shean Tokuta
(74) *Attorney, Agent, or Firm* — Kunzler Needham Hilton

(57) ABSTRACT

Apparatuses, methods, and systems are disclosed for determining an action for a network function based on network analytics. One apparatus includes a processor and a network interface that receives a first set of analytics from at least one network analytics function in a mobile communication network, the first set of analytics relating to a first KPI. The processor determines from the first set of analytics whether a first condition is met and determines a first set of actions when the first condition is not met. Via the network interface, the processor sends the first set of actions to at least one network function in the mobile communication network, each action in the first set of actions being sent to an associated network function.

20 Claims, 15 Drawing Sheets

(56) References Cited

U.S. PATENT DOCUMENTS

| | | | | |
|---|---|---|---|---|
| 11,706,110 | B2 * | 7/2023 | Patil | H04L 43/065 |
| | | | | 709/224 |
| 2020/0112868 | A1 * | 4/2020 | Shariat | H04W 48/17 |
| 2020/0252813 | A1 * | 8/2020 | Li | G06Q 20/382 |
| 2020/0288296 | A1 * | 9/2020 | Fiorese | H04W 64/006 |
| 2021/0014141 | A1 * | 1/2021 | Patil | H04W 76/25 |
| 2021/0204154 | A1 * | 7/2021 | Li | H04L 41/40 |
| 2021/0314906 | A1 * | 10/2021 | Matolia | H04W 24/10 |
| 2023/0269141 | A1 * | 8/2023 | Han | H04L 47/83 |
| 2023/0403677 | A1 * | 12/2023 | Matolia | H04W 8/02 |
| 2023/0413114 | A1 * | 12/2023 | Ly | H04W 28/0215 |
| 2024/0073709 | A1 * | 2/2024 | Karampatsis | H04W 24/02 |
| 2024/0414594 | A1 * | 12/2024 | Venkob | H04W 72/53 |
| 2025/0069172 | A1 * | 2/2025 | Espino | G06Q 50/20 |
| 2025/0176034 | A1 * | 5/2025 | Yu | H04W 74/0833 |
| 2025/0247296 | A1 * | 7/2025 | Vaishnavi | H04W 24/02 |

FOREIGN PATENT DOCUMENTS

| | | | | | |
|---|---|---|---|---|---|
| WO | WO-2022026482 | A1 * | 2/2022 | | H04W 24/02 |
| WO | WO-2022144087 | A1 * | 7/2022 | | H04W 24/02 |

OTHER PUBLICATIONS

3GPP, "3rd Generation Partnership Project; Technical Specification Group Services and System Aspects; Study on enablers for network automation for the 5G System (5GS); Phase 2 (Release 17)", 3GPP TR 23.700-91 V17.0.0, Dec. 2020, pp. 1-382.

3GPP, "3rd Generation Partnership Project; Technical Specification Group Services and System Aspects; Study of Enablers for Network Automation for 5G (Release 16)", 3GPP TR 23.791 V16.2.0, Jun. 2019, pp. 1-124.

3GPP, "3rd Generation Partnership Project; Technical Specification Group Services and System Aspects; Telecommunication management; Study on management aspects of communication services (Release 16)", 3GPP TR 28.805 V16.1.0, Dec. 2019, pp. 1-42.

3GPP, "3rd Generation Partnership Project; Technical Specification Group Services and System Aspects; Management and orchestration; Self-Organizing Networks (SON) for 5G networks (Release 16)", 3GPP TS 28.313 V16.0.0, Sep. 2020, pp. 1-44.

3GPP, "3rd Generation Partnership Project; Technical Specification Group Services and System Aspects; Management and orchestration; Management services for communication service assurance; Requirements (Release 17)", 3GPP TS 28.535 V17.0.0, Dec. 2020, pp. 1-19.

3GPP, "3rd Generation Partnership Project; Technical Specification Group Services and System Aspects; Management and orchestration; Performance assurance (Release 16)", 3GPP TS 28.550 V16.7.0, Dec. 2020, pp. 1-85.

* cited by examiner

1
NETWORK ANALYTICS-BASED ACTION

The subject matter disclosed herein relates generally to wireless communications and more particularly relates to determining an action for a network function based on network analytics.

BACKGROUND

The following abbreviations and acronyms are herewith defined, at least some of which are referred to within the following description.

Third Generation Partnership Project ("3GPP"), Fifth-Generation Core ("5GC"), Application Function ("AF"), Access and Mobility Management Function ("AMF"), Access Network ("AN"), Access Point Name ("APN"), Application Server ("AS"), Application Programing Interface ("API"), Data Network Access Identifier ("DNAI"), Data Network Name ("DNN"), Downlink ("DL"), Edge Application Server ("EAS"), Edge Computing ("EC"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), Identifier ("ID"), IP Multimedia Subsystem ("IMS," aka "IP Multimedia Core Network Subsystem"), Internet Protocol ("IP"), Key Performance Indicator ("KPI"), Long Term Evolution ("LTE"), LTE Advanced ("LTE-A"), Medium Access Control ("MAC"), Machine Learning ("ML"), Mobile Network Operator ("MNO"), Mobility Management Entity ("MME"), Non-Access Stratum ("NAS"), Network Automation Function ("NAUF"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Network Slice Selection Function ("NSSF"), Network Data Analytics Function ("NWDAF"), Operations, Administration and Maintenance ("OAM"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), RAT and/or Frequency Selection Policy ("RFSP"), Radio Resource Control ("RRC"), Receive ("Rx"), Single Network Slice Selection Assistance Information ("S-NSSAI"), Serving Gateway ("SGW"), Session Management Function ("SMF"), Tracking Area Identifier ("TAI"), Transmission Control Protocol ("TCP"), Transmit ("Tx"), Unified Data Management ("UDM"), User Entity/Equipment (Mobile Terminal) ("UE"), Uplink ("UL"), User Plane ("UP"), User Plane Function ("UPF"), Universal Mobile Telecommunications System ("UMTS"), User Datagram Protocol ("UDP"), Wireless Local Area Network ("WLAN"), and Worldwide Interoperability for Microwave Access ("WiMAX").

In certain mobile communication networks, network data analytics may be performed by a Network Data Analytics Function ("NWDAF"). The NWDAF provides analytic output to one or more Analytics Consumer NFs based on Data Collected from one or more Data Producer NFs.

BRIEF SUMMARY

Methods for supporting prescriptive analytics are disclosed. In various embodiments, the disclosed methods are computer-implemented using a processor and machine-readable code. Apparatuses and systems also perform the functions of the methods.

One method of a network automation function for determining an action for a network function based on network analytics includes receiving a first set of analytics from at least one network analytics function in the mobile communication network, the first set of analytics relating to a first KPI. The method includes determining from the first set of analytics whether a first condition is met and determining a first set of actions when the first condition is not met. The method includes sending the first set of actions to at least one network function in the mobile communication network, each action in the first set of actions being sent to an associated network function.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
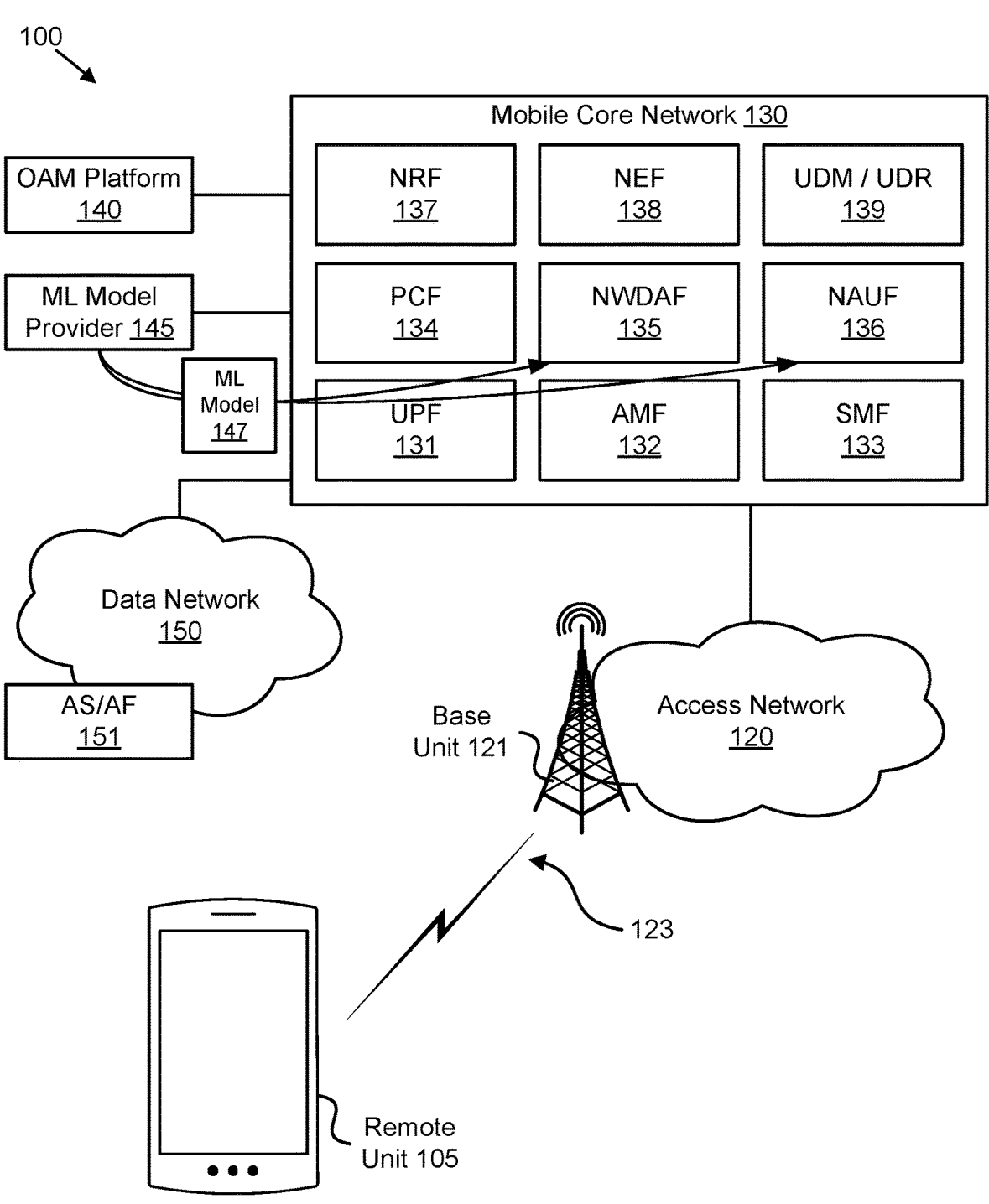
FIG. 1 is a diagram illustrating one embodiment of a wireless communication system for determining an action for a network function based on network analytics.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the schematic flowchart diagrams and/or schematic block diagram.

The schematic flowchart diagrams and/or schematic block diagrams in the Figures illustrate the architecture, functionality, and operation of possible implementations of appara- tuses, systems, methods, and program products according to various embodiments. In this regard, each block in the schematic flowchart diagrams and/or schematic block dia- grams may represent a module, segment, or portion of code, which includes one or more executable instructions of the code for implementing the specified logical function(s).

It should also be noted that, in some alternative imple- mentations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures Like numbers refer to like elements in all figures, including alternate embodiments of like elements.

Methods, apparatuses, and systems are disclosed for sup- porting prescriptive analytics in a mobile communication network, specifically by defining centralized solutions for retrieving network analytics and determining actions to be taken to meet key performance indicators ("KPIs"). As discussed above, the mobile communication network may deploy a network data analytics function ("NWDAF") that provides analytics info to the core network and other con- suming entities. The Analytics that the NWDAF provides are based on training an ML model with data collected from the relevant Data Producer NFs. For each analytics output, identified by an Analytic ID there is a specific ML model used. The NWDAF uses the trained model to provide statistics or prediction to an NF's request. The requesting NF is referred to as "Consumer NF." For example, a consumer NF—or Application Function ("AF")—may request analyt- ics information and prove an Analytic ID and parameters with the request. A Consumer NF may ask for analytics either in form of statistics or predictions.

The NWDAF derives the analytics by collecting relevant data from NFs. Candidate NFs include application functions, network exposure functions, control plane NFs, user plane functions, OAM, and the like. For example, the NWDAF derives statistics or predictions for UE location by collecting location changes events from the AMF. The NWDAF retrieves the related data from the NFs by using the Event Exposure Subscribe/Notify service operation. The NWDAF subscribes from the NF to retrieve specific data by including an Event ID (e.g., Location Changes). The NF/AFs then Notifies the NWDAF when the "Event" takes place. For example, an AMF NF notifies the NWDAF that the UE location changed. The NWDAF uses various data process- ing techniques to derive analytics information from the collected data and reports the analytics to the requesting NF.

Under a distributed approach, each NF may decide its own actions independently from other NFs and without having an overall picture of the whole network. For example, in a distributed approach both NSSF and PCF may be consumer of analytics for service experience. The NSSF may be a consumer of analytics for service experience for a slice and slice load and the PCF may be a consumer for service experience for one or more applications. Both NSSF and PCF may carry out actions independently based on the analytics received but both actions may counteract each other or both actions may not be required to improve the service experience. A similar problem exists for another use case when a UE's application is connected to an Edge Application Server via the 3GPP network. In such a case both SMF and AF may a consumer of analytics for service experience at a specific DNAI location. If both AF and SMF decide an action the action may counteract each other which may not be efficient in a network infrastructure.

This disclosure addresses this problem by defining a centralized solution in which a central network function, referred to as Network Automation Function ("NAUF"), retrieves network analytics from one or more NWDAFs and determines the actions that should be taken by the NFs to meet pre-configured system-wide KPIs. In contrast to the current distributed approach, in which every action is taken independently from and uncoordinated with other actions, the centralized solution exploits system-wide knowledge and can take coordinated actions that collectively optimize the entire network operation.

The central network function receives a first set of ana- lytics from one or more network analytics functions in the mobile communication network. For example, the first set of analytics can be "Service Experience for a slice" according to the first use case, described in greater detail below. The central network function receives the first set of analytics after requesting the first set of analytics from the one or more network analytics functions.

The first set of analytics may be determined by the central network function based on a first KPI, which can be received by the processor or can be configured in the apparatus. For example, if the first KPI="service experience for Slice-x", then first set of analytics may be Observed Service Experi- ence analytic information for Slice-x (optionally, for a target area serviced by Slice-x) to determine if the service expe- rience is above or below SLA agreements. As another example, if the first KPI="network performance for Slice- y", then first set of analytics may be Network Performance analytics for Slice-y.

The central network function determines from the first set of analytics whether a first condition is met. For example, the condition could be "first KPI<high threshold" or "low threshold<first KPI<high threshold." If the first condition is not met, then the central network function determines a first set of recommended actions.

Here, determining the first set of recommended actions when the first condition is not met, may include determining a second set of analytics based on the first KPI (the second set of analytics describe better why the condition is not met). The second set of analytics can be explanatory analytics, i.e., analytics explaining why the condition is not met. The central network function derives the first set of recom- mended action based on the second set of analytics.

Examples of recommended action are described in greater detail below. Each set of recommended actions can contain actions for AMF, for SMF, for PCF, etc. The central network function associates each recommended action in the first set of recommended actions with a network function in the mobile communication network and sends each recom- mended action in the first set of recommended actions to the associated network function.

After sending the recommended actions, the central net- work function keeps determining if the first condition is not met. If the first condition is not met after a first time period from sending the first set of recommended actions, then the apparatus can create a second set of recommended actions and send each recommended action in the second set of recommended actions to the associated network function. The second set of recommended actions can be based on a third set of analytics, wherein the third set of analytics is created after the first time period from sending the first set of recommended actions.

FIG. 1 depicts a wireless communication system 100 for determining an action for a network function based on network analytics, according to embodiments of the disclosure. In one embodiment, the wireless communication system 100 includes at least one remote unit 105, at least one base unit 121, at least one access network ("AN") 120, and a mobile core network 130 in a PLMN. The AN 120 may be composed of at least one base unit 121. The remote unit 105 may communicate with the access network 120 using 3GPP communication links and/or non-3GPP communication links, according to a radio access technology deployed by the AN 120. Even though a specific number of remote units 105, base units 121, ANs 120, and mobile core networks 130 are depicted in FIG. 1, one of skill in the art will recognize that any number of remote units 105, base units 121, ANs 120, and mobile core networks 130 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the access network 120 via uplink ("UL") and downlink ("DL") communication signals. Furthermore, the UL and DL communication signals may be carried over the communication links 123. Note, that the access network 120 is an intermediate network that provide the remote units 105 with access to the mobile core network 130.

In some embodiments, the remote units 105 communicate with an application server and/or application function ("AS/AF") 151 (or other communication peer) via a network connection with the mobile core network 130. For example, an application in a remote unit 105 (e.g., web browser, media client, telephone/VoIP application) may trigger the remote unit 105 to establish a PDU session (or other data connection) with the mobile core network 130 using the access network 120. The mobile core network 130 then relays traffic between the remote unit 105 and the AS/AF 151 (e.g., in the data network 150) using the PDU session.

The PDU session represents a logical connection between the remote unit 105 and the UPF 131. In order to establish the PDU session, the remote unit 105 must be registered with the mobile core network 130. Note that the remote unit 105 may establish one or more PDU sessions (or other data connections) with the mobile core network 130. As such, the remote unit 105 may have at least one PDU session for communicating with the data network 150. The remote unit 105 may establish additional PDU sessions for communicating with other data networks and/or other communication peers.

The base units 121 may be distributed over a geographic region. In certain embodiments, a base unit 121 may also be referred to as an access terminal, an access point, a base, a base station, a Node-B, an eNB, a gNB, a Home Node-B, a relay node, a device, or by any other terminology used in the art. The base units 121 are generally part of a radio access network ("RAN"), such as the access network 120, that may include one or more controllers communicably coupled to one or more corresponding base units 121. These and other elements of radio access network are not illustrated but are well known generally by those having ordinary skill in the art. The base units 121 connect to the mobile core network 130 via the access network 120.

The base units 121 may serve a number of remote units 105 within a serving area, for example, a cell or a cell sector, via a communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the communication links 123. The communication links 123 may be any suitable carrier in licensed or unlicensed radio spectrum. The communication links 123 facilitate communication between one or more of the remote units 105 and/or one or more of the base units 121.

In one embodiment, the mobile core network 130 is a 5G core ("5GC") or an evolved packet core ("EPC"), which may be coupled to a data network (e.g., the data network 150, such as the Internet and private data networks, among other data networks). A remote unit 105 may have a subscription or other account with the mobile core network 130. The present disclosure is not intended to be limited to the implementation of any particular wireless communication system architecture or protocol.

The mobile core network 130 includes several network functions ("NFs"). As depicted, the mobile core network 130 includes at least one user plane function ("UPF") 131 that serves the access network 120. The mobile core network 130 also includes multiple control plane functions including, but not limited to, an Access and Mobility Management Function ("AMF") 132, a Session Management Function ("SMF") 133, a Policy Control Function ("PCF") 134, a Network Repository Function ("NRF") 137 (used by the various NFs to discover and communicate with each other over APIs), a Network Exposure Function ("NEF") 138, and a Unified Data Management function ("UDM") 139.

Currently, when an AF is an external entity to a PLMN the interaction between the AF and the network is via a Network Exposure Function ("NEF") 138. The NEF 138 supports external exposure of capabilities of network functions including for monitoring occurrences of events. In certain embodiments, the mobile core network 130 may also include, an Authentication Server Function ("AUSF"), or other NFs defined for the 5GC.

The mobile core network 130 also includes at least one NWDAF 135 and a Network Automation Function ("NAUF") 136. As described above, the NWDAF 135 provides analytics info to the core network functions and other consuming entities. As described in further detail below, the NAUF 136 receives a plurality of analytics (i.e., multiple analytic ID) from one or more NWDAFs and determines the actions that should be taken by one or more Network Functions, in order to meet Key Performance Indicators ("KPIs"). Note that the mobile core network 130 may be communicatively coupled to one or more OAM platforms 140 and a ML model provider 145. The ML model provider 145 sends ML models to the NAUF 136 and/or NWDAF 135.

In various embodiments, the mobile core network 130 support different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF 133 and a UPF 131, but the various network slices share the AMF 132, the PCF 134, and the UDM/UDR 139. In another example, each network slice includes an AMF 132, an SMF 133 and a UPF 131. Although specific numbers and types of network functions are depicted in FIG. 1, one of skill in the art will recognize that any number and type of network functions may be included in the mobile core network 130.

Figure 2A:
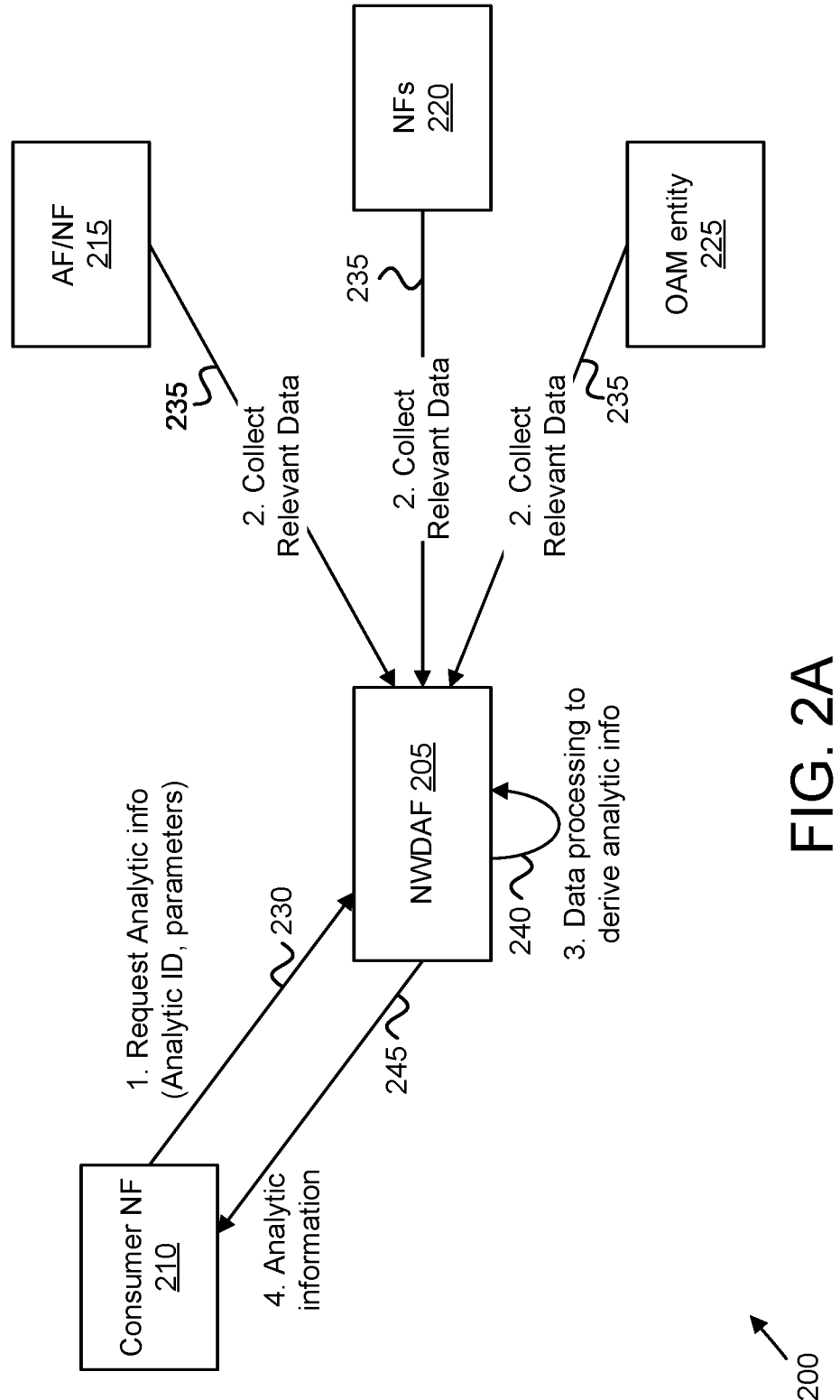
FIG. 2A is a diagram illustrating one embodiment of a NWDAF architecture that derives analytics based on information collected by other NFs.

FIG. 2A depicts a NWDAF architecture 200 for deriving analytics based on information collected by other NFs, according to embodiments of the disclosure. The NWDAF architecture 200 includes a NWDAF 205 (which may be one embodiment of the NWDAF 135), a Consumer NF 210, one or more data producer entities capable of providing data relating to various Event IDs, depicted as the AF/NF 215, the NFs 220, and the OAM entity 225.

As depicted in FIG. 2A, the Split-Architecture NWDAF 205 derives analytics based on an NF request, i.e., from the Consumer NF 210 (see messaging 230). The NF request can either be a subscription to analytics or a one-time request. In various embodiments, the NF request includes the following: 1) an Analytic ID, identifying the type of analytics requested (e.g., UE mobility analytics); 2) Analytics Filter information, which provides additional information on the analytics information required (e.g., targeting a specific Application or a Specific area of interest); 3) the Target of Analytics Reporting, which identifies whether the information is for a specific UE a group of UEs or any UE; 4) Analytic Reporting Information, which provides information on when and how the NWDAF 205 should report analytics; 5) an Analytics Target Period, which provide information whether statistics or predictions are requested; 6) one or more Reporting Thresholds, which indicate conditions on the level of each requested analytics that when reached will be notified by the NWDAF 205; 7) a preferred level of accuracy of the analytics (e.g., Low/High); and 8) a Time when the information should be provided.

The NWDAF 205 derives the analytics by collecting relevant data from NFs. The NWDAF 205 identifies the NFs 215-220 to collect the data based on the Analytic ID requested by the Consumer NF 210. For example, if UE mobility analytics are requested, then the NWDAF 205 derives statistics or predictions for UE location by subscribing from the AMF 132 to retrieve location changes events of a specific UE. The NWDAF 135 retrieves the related data from the NFs by using the Event Exposure Subscribe/Notify service operation (see messaging 235).

The NWDAF 205 perform data processing to derive analytic information (see action 240). The NWDAF 205 also provides analytic information to the consumer NF 210 (see messaging 245).

In some embodiments, a consumer NF 210 when requesting one-time analytics from the NWDAF 205 may provide an indication of the time when analytics information is needed. If the time is reached and the NWDAF 205 does not provide an answer (i.e., a response with Analytics information) the NWDAF 205 may indicate the reason for not providing a response. In addition, when a consumer NF 210 subscribes to receive periodic analytic information, the consumer NF 210 may request a preferred level of analytics of the accuracy.

In various embodiments, the NWDAF 205 may include in the response to the consumer NF the following information: 1) a Timestamp of analytics generation, which allows consumers to decide until when the received information shall be used; 2) a Validity period, which defines the time period for which the analytics information is valid; 3) a Probability assertion, i.e., confidence in the prediction, which may be based on preferred level of accuracy requested by the consumer NF. In some embodiments, a consumer NF 210 may deem a received notification from NWDAF 205 for a given feedback as invalid based on the Timestamp of analytics generation.

Figure 2B:
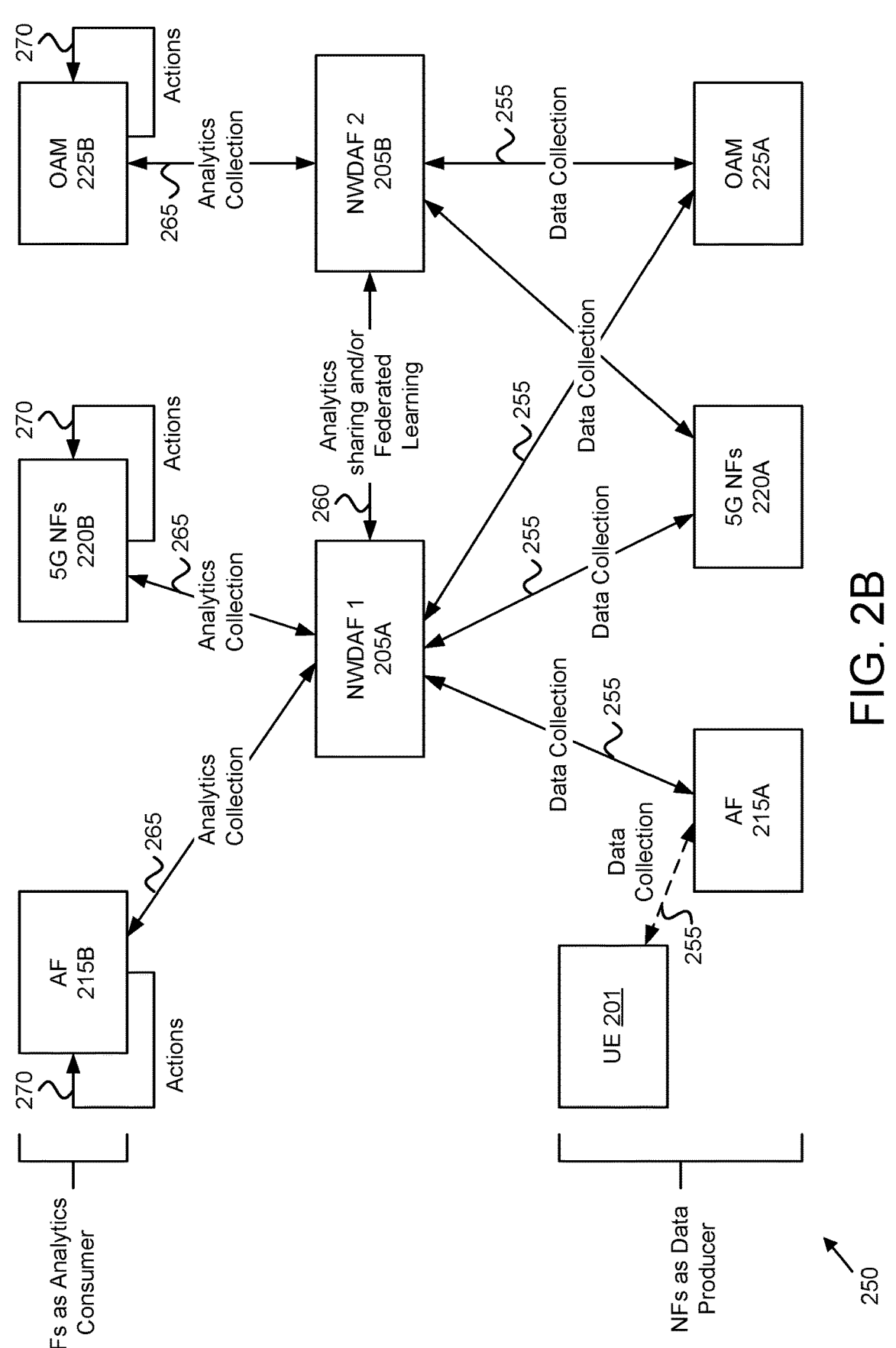
FIG. 2B is a diagram illustrating one embodiment of a network deployment for deriving and providing analytics to analytics consumer NFs.

FIG. 2B depicts a network deployment 250 for determining an action for a network function based on network analytics, according to embodiments of the disclosure. The network deployment 250 includes the multiple NWDAFs 205 (here depicted as a first NWDAF 205A and a second NWDAF 205B). In the depicted embodiment, the NFs include multiple Data Producer NFs (here depicted as the UE 201, the AF 215A, the 5G NFs 220A, and OAM platform 225A). The NWDAFs 205A-205B collect data 255 from the Data Producer NFs. In some embodiments, the NWDAFs 205A-205B share analytics 260 and/or perform federated learning, i.e., train a ML model across multiple servers (NWDAFs). The NWDAFs 205A-205B then provide analytics to a set of Analytics Consumer NFs, here depicted as the AF 215B, the 5G NFs 220B (e.g., SMF, AMF, PCF) and OAM platform 225B.

A more complete list of potential Analytics Consumer NF for each Analytics output the NWDAF provides is described in the Table 1 below.

TABLE 1

| Example Analytics Consumer NFs for each Analytic Output the NWDAF provides | |
| --- | --- |
| NWDAF Analytics Output | Analytics Consumer NF |
| Slice Load Level | PCF, NSSF |
| Observed Service Experience | PCF, OAM |
| NF load analytics | All 5G core NFs, OAM |
| Network Performance Analytics | PCF, NEF, AF, or OAM |
| UE Mobility Analytics | AMF, SMF |
| UE Communication Analytics | AMF, SMF, PCF |
| Expected UE behavioral analytics | AMF, UDM, AF or OAM |
| Abnormal behavior analytics | AMF, SMF, PCF |
| User Data Congestion analytics | NEF, AF |
| QoS Sustainability Analytics | AF |

The trigger for an Analytics Consumer NF to receive analytics from an NWDAF may be: A) based on the triggers (e.g., event reports or requests) from the other NF(s); or B) based on a local event, e.g., the detected UE behavior or network performance.

Based on the received analytics output, an Analytics Consumer NF may identify an issue, and, in response, it may take one or more actions to alleviate the issue. For example, if the analytics consumer is a PCF and determines that the Observed Service experience for an application is below expectations, the PCF may upgrade the QoS for these applications to ensure that the service experience is improved. Hence, each Analytics Consumer NF can request certain analytics and can apply the received analytics to improve some network parameters.

However, when the Analytics Consumer NFs act independently, their actions may counteract each other or may be redundant (e.g., all actions may not be required to improve the service experience), leading to network inefficiency.

Figure 3:
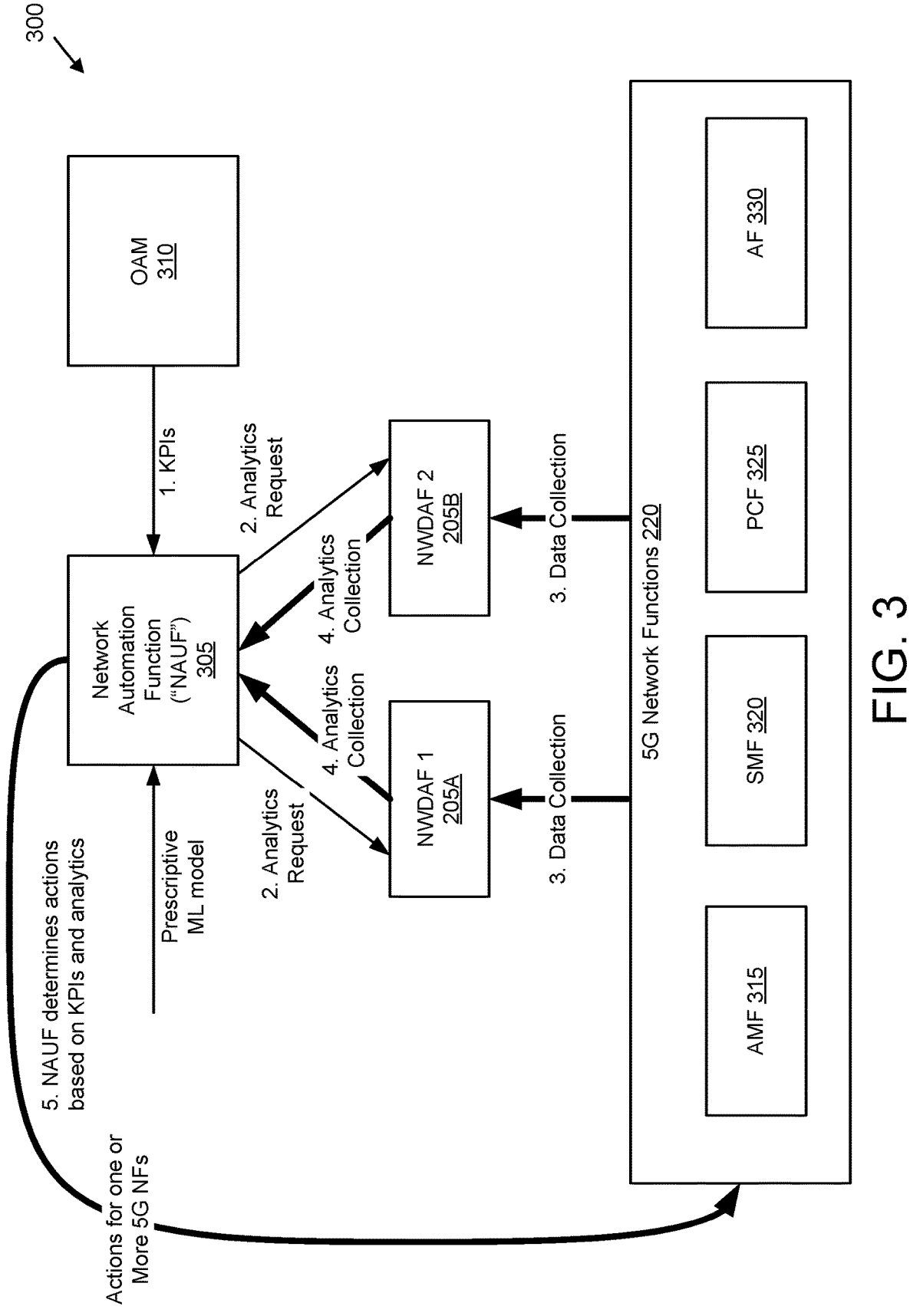
FIG. 3 is a diagram illustrating one embodiment of a prescriptive analytics architecture for enabling network automation.

FIG. 3 depicts a prescriptive analytics architecture 300 for enabling network automation, according to embodiments of the disclosure. In order to have a network with more informed decisions based on analytics provided by NWDAF, a new function is introduced, the Network Automation Function ("NAUF") 305, that receives a plurality of analytics (i.e., multiple analytic ID) from one or more NWDAFs 205 and determines the actions that should be taken by one or more 5G Network Functions 220, in order to meet KPIs.

The analytics architecture 300 operates as follows: At Step 1, the NAUF 305 is configured by the network operator with one or more KPIs. The KPIs may be configured via an OAM platform 310.

At Step 2, the NAUF 305 determines the analytics required to determine whether the KPIs are fulfilled, and requests from one or more NWDAFs 205A-205B to receive these analytics.

At Step 3, each NWDAF 205 collects data from one or more 5G Network Functions 220 (e.g., AMF 315, SMF 320, PCF 325, and/or AF 330) and derives the analytics requested by the NAUF 305. Note that while Core NFs are depicted, in other embodiments the NWDAFs 205A-205B may collect data from RAN functions and/or UEs. The analytics derived by NWDAF 205A-205B may include:

a. Explanatory analytics, i.e., analytics that describe current network conditions. Examples of explanatory analytics includes: the current load of a network slice instance, the current NF load, the current network performance, etc.; or b. Descriptive analytics, i.e., analytics that describe the statistical behavior of certain network elements. Examples of descriptive analytics include: UE mobility analytics, abnormal behavior analytics, etc.; or c. Predictive analytics, i.e., analytics that describe a network condition in the future. For example, "how much will be load level of a network slice?" or "how much will be the user-plane congestion in a certain network area?"

At Step 4, the NWDAF(s) 205A-205B provide the requested analytics to the NAUF 305.

At Step 5, the NAUF 305 applies the received analytics from NWDAF(s) 205A-205B to derive another type of analytics, namely, prescriptive analytics, that describe necessary actions for correcting identified issues. The NAUF 305 uses its prescriptive analytics engine (i.e., ML model) to identify network issues and to recommend actions for correcting these issues. Typically, the issues identified by NAUF 305 are deviations from desired KPI values. A new service-based procedure may be used when the NAUF 305 recommends actions to an NF 220.

The actions set by the NAUF 305 will change the behavior of one or more NFs 220 which results in the NWDAF(s) 205A-205B collecting updated behavior data from the 5G NFs 220. Consequently, the NWDAF(s) 205A-205B will derive updated analytics that will be received by the NAUF 305. This forms a closed-loop system allowing the NAUF 305 to observe and evaluate if the action taken improves the performance of the system. The NAUF 305 evaluates continuously from the analytics received whether the actions have improved the performance of the system according to the target KPI configured by the network operator. If the target KPI has not improved the NAUF 305 uses the prescriptive engine ML model to identify if additional actions are required.

In one embodiment, the action derived by the NAUF 305 may be a recommendation, i.e., a policy recommendation to a PCF 325. In an alternative embodiment, the NAUF 305 may collect input (real-time) data directly from 5G core NFs 220 to make real-time decisions. The NAUF 305 decides actions and observes if the action had the required results by inspecting real-time data collected by one or more NFs 220 or one or more analytics information collected by one or more NWDAF(s) 205A-205B.

In one embodiment, the NAUF 305 is configured by the network operator with a KPI goal ensuring that the service experience provided by a slice used by a service provider is according to SLA agreements made between a network operator and the service provider. The KPI goal configuration may target a specific area of interest. To support such KPI goal, the NAUF 305 collects a first set of analytics from one or more NWDAF(s) 205A-205B. The NAUF 305 may subscribe to the first set of analytics from the NWDAF(s) 205A-205B. A first set of analytics may be the following: Service Experience for a slice (optionally, in a target area) to determine if the service experience is above or below SLA agreements.

If the analytics indicate that the service experience does not meet the KPI goals, the NAUF 305 uses a prescriptive ML model to identify issues and determine actions. The NAUF 305 obtains a second set of analytics to determine issues with NF serving the slice. The NAUF 305 may subscribe to the second set of analytics from the NWDAF(s) 205A-205B. The second set of analytics may include the following:

a. Slice Load for a slice to determine the load of the slice b. NF load to determine the load status of AMF 315 and/or SMF 320 serving the slice c. The NAUF 305 may also identify risks by collecting real time data from one or more NFs (i.e., current load of NF from the NRF, current number of UEs served in a slice from OAM).

The NAUF 305 uses the analytics for slice load and NF load to determine if the slice is overloaded. If the NAUF 305 identifies issues, e.g., slice load is high, the NAUF 305 determines an action and identify the NFs that will carry out such action. Examples of potential actions are shown below in Table 2.

TABLE 2

| Potential recommended actions by NAUF based on second set of analytics | | |
| --- | --- | --- |
| Issue Identified | Recommended Action | Target NF |
| Slice load is high | Do not accept new UE registration at a specific slice | NSSF |
| AMFs are overloaded | Do not select overloaded AMF at new UE registrations | NSSF, AMF |
| AMFs are overloaded | Suggest backoff time for overloaded AMF | AMF |

After the NAUF 305 has performed an action, the NAUF 305 evaluates if the action had the required results by continuously evaluating the first set of analytics provided by one or more NWDAF(s) 205A-205B. If the NAUF 305 determines that after a certain period of time (configurable at the NAUF 305 by the network operator) the actions did not achieve the required results, then the NAUF 305 may determine additional actions. The NAUF 305 may also update the ML model that the previously performed action did not achieve the required results. This will allow the NAUF 305 to determine which action provides the best result in meeting the KPIs configured at the NAUF 305.

In some embodiments, the NAUF 305 requests a third set of analytics to determine new actions if none of the actions performed based on the second set of analytics had the required result. The NAUF 305 may subscribe to the third set of analytics from the NWDAF(s) 205A-205B.

A third set of analytics may include the following analytics: A) User Data Congestion Analytics for a slice, optionally in a target area to determine if UEs are experiencing congestion when transferring data. In addition, the NAUF 305 may also request from the NWDAF(s) 205A-205B to provide the top applications that cause peak throughput in the network (i.e., UPF 131); B) Traffic Dispersion analytics to determine if UEs are in an area that use most of their data volume; C) Abnormal UE behavior analytics (optionally in a target area) to determine if there are any misbehaving UEs that impact the service experience for the slice; and/or D) Service Experience per RFSP (optionally in a target area) to determine the RFSP that offers the best service experience for UEs accessing an application via a slice.

The NAUF 305 uses the third set of analytics to identify the following risks: A) Potential areas where there is high load, according to user data congestion analytics and traffic dispersion analytics; B) UEs that are experiencing congestion in that area; C) UEs that contribute to the congestion (e.g., cause high peak throughput); and/or D) Misbehaving UEs.

If issues are identified the NAUF 305 can determine and suggest actions as described in Table 3.

TABLE 3

| Potential recommended actions by NAUF based on third set of analytics | | |
| --- | --- | --- |
| Issue Identified | Recommended Action | Target NF |
| List of UEs that cause peak throughput. (identified via user data congestion and traffic dispersion analytics) | New RFSP policies for these UEs (NOTE 1) or new AM/SM policies blocking these UEs to access the network | PCF |
| List of UEs experiencing congestion | New RFSP policies for these UEs (NOTE 1) | PCF |

TABLE 3-continued

| Potential recommended actions by NAUF based on third set of analytics | | |
| --- | --- | --- |
| Issue Identified | Recommended Action | Target NF |
| Misbehaving UEs | new AM/SM policies blocking these UEs to access the network | PCF |

NOTE 1:
The NAUF uses Service Experience per RFSP analytics to determine the optimal RFSP for UEs Similar to the behavior of the NAUF 305 after performing an action based on the second set of analytics, after the NAUF 305 has performed an action based on a third set of analytics the NAUF 305 evaluates if the action had the required results by continuously evaluating the first set of analytics provided by one or more NWDAF(s) 205A-205B. The NAUF 305 may also update the ML model that the previously performed action did not achieve the required results. This will allow the NAUF 305 to determine which action provides the best result in meeting the KPIs configured at the NAUF 305.

In an alternative embodiment, the NAUF 305 may trigger the NWDAF(s) 205A-205B to collect the second and third set analytics at the same time.

Figure 4A:
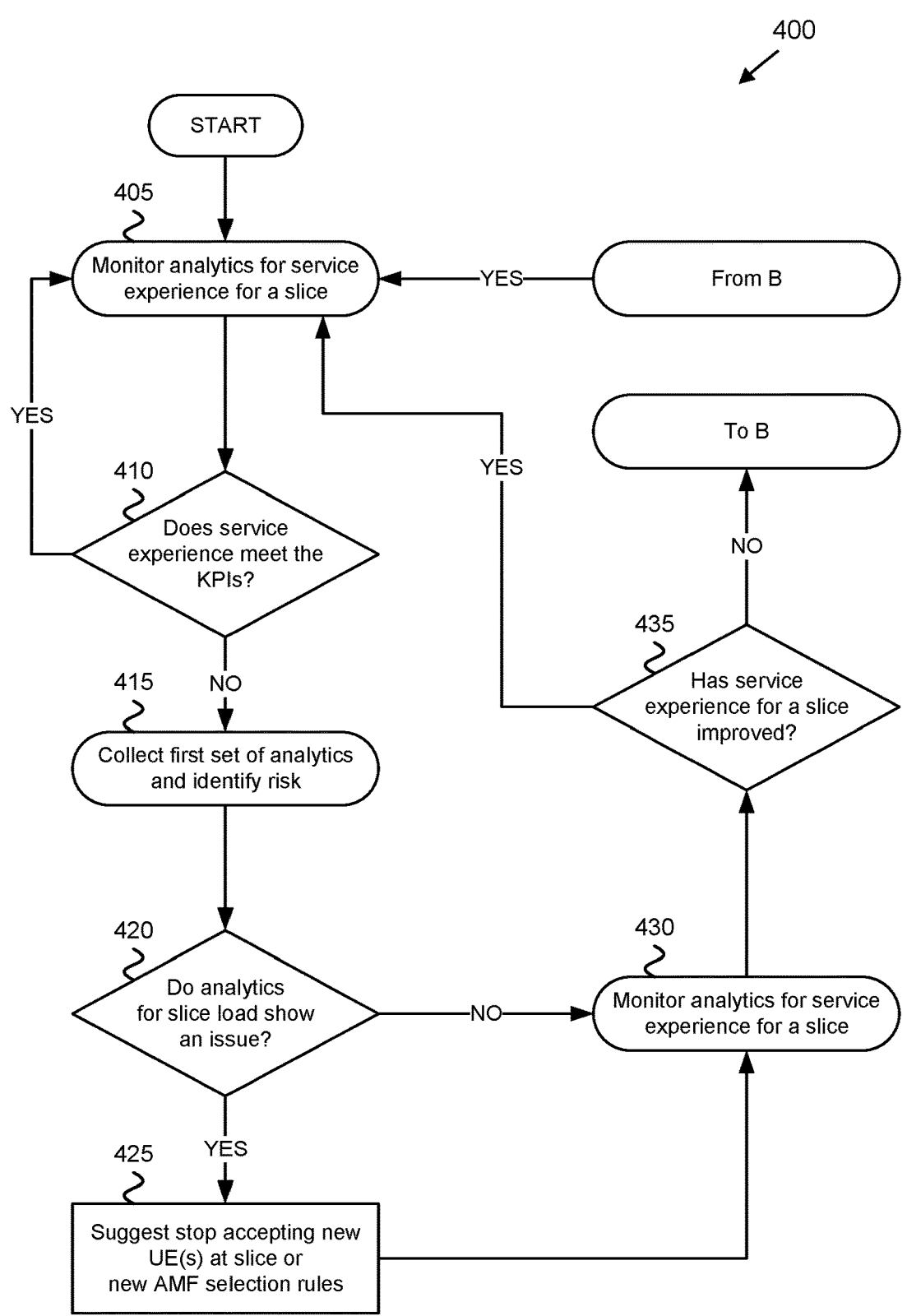
FIG. 4A is a flow diagram illustrating one embodiment of a NAUF procedure for optimizing service experience for a slice.
Figure 4B:
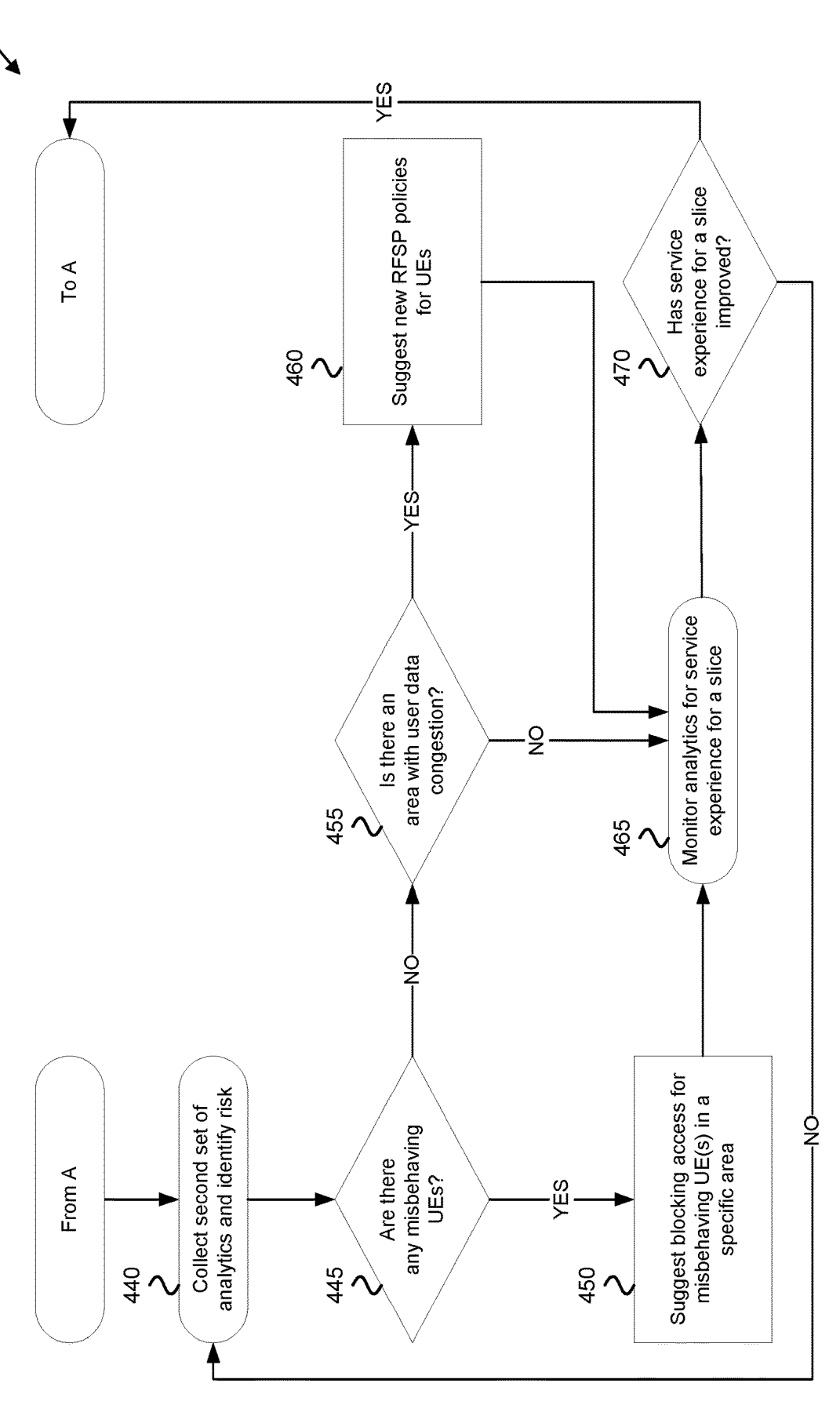
FIG. 4B is a continuation of the procedure depicted in FIG. 4A.

FIGS. 4A-4B depicts the overall procedure 400 for the NAUF 305 to identify issues, determine actions and evaluate if action had the required result. Starting at FIG. 4A, the procedure 400 starts and the NAUF 305 monitors analytics for service experience for a slice (see block 405). The NAUF 305 determines whether the service experience meets the KPIs (see decision point 410). If yes, then the NAUF 305 continues to monitor analytics for service experience (see block 405). Otherwise, if no, then the NAUF 305 collects a first set of analytics and identifies risk (see block 415). The NAUF 305 determines whether analytics for slice load show an issue (see decision point 420). If yes, then the NAUF 305 suggests to stop accepting new UE(s) at the slice or suggests new AMF selection rules (see block 425) and monitors analytics for service experience for the slice (see block 430). If no, the NAUF 305 monitors analytics for service experience for the slice (see block 430). The NAUF 305 determines whether service experience for a slice has improved (see decision point 435). If yes, then the NAUF 305 continues to monitor analytics for service experience (see block 405).

Continuing on FIG. 4B, if the NAUF 305 determines that service experience for a slice has not improved (from decision point 435), then the NAUF 305 collects a second set of analytics and identifies risk (see block 440). The NAUF 305 determines whether there are any misbehaving UEs (see decision point 445). If yes, then the NAUF 305 suggests blocking access for misbehaving UE(s) in a specific area (see block 450) and monitors analytics for the service experience for a slice (see block 465). If no, the NAUF 305 determines whether there is an area with user data congestion (see block 455). If yes, then the NAUF 305 suggests new RFSP policies for UEs (see block 460) and monitors analytics for the service experience for a slice (see block 465). If no, the NAUF 305 monitors analytics for the service experience for a slice (see block 465). The NAUF 305 determines whether service experience for a slice has improved (see decision point 470). If yes, then the NAUF 305 continues to monitor analytics for service experience (see block 405). If no, the NAUF 305 continues to collect a second set of analytics and identifies risk (see block 440).

Figure 5A:
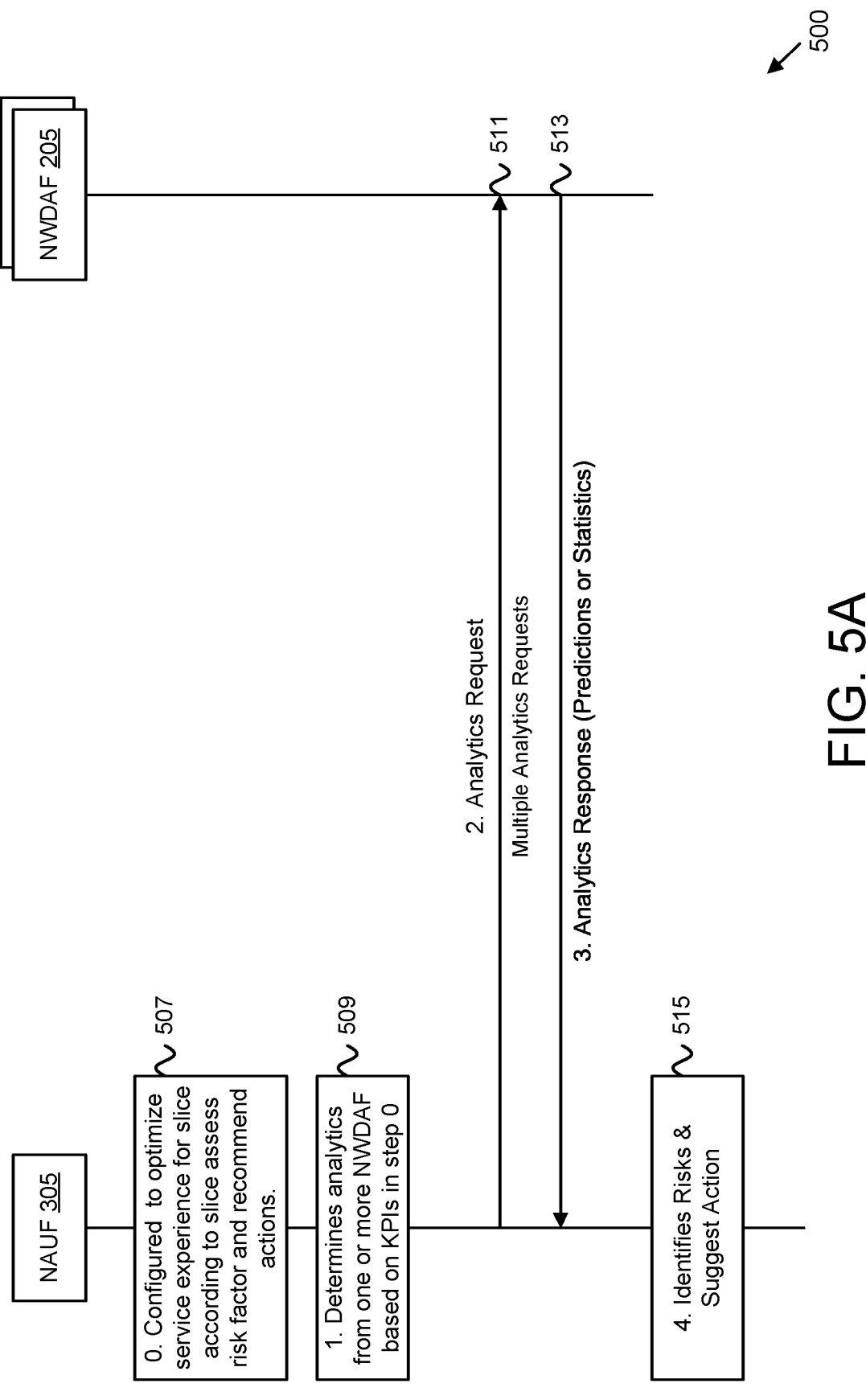
FIG. 5A is a signal flow diagram illustrating one embodiment of a procedure for optimizing service experience for a slice.
Figure 5B:
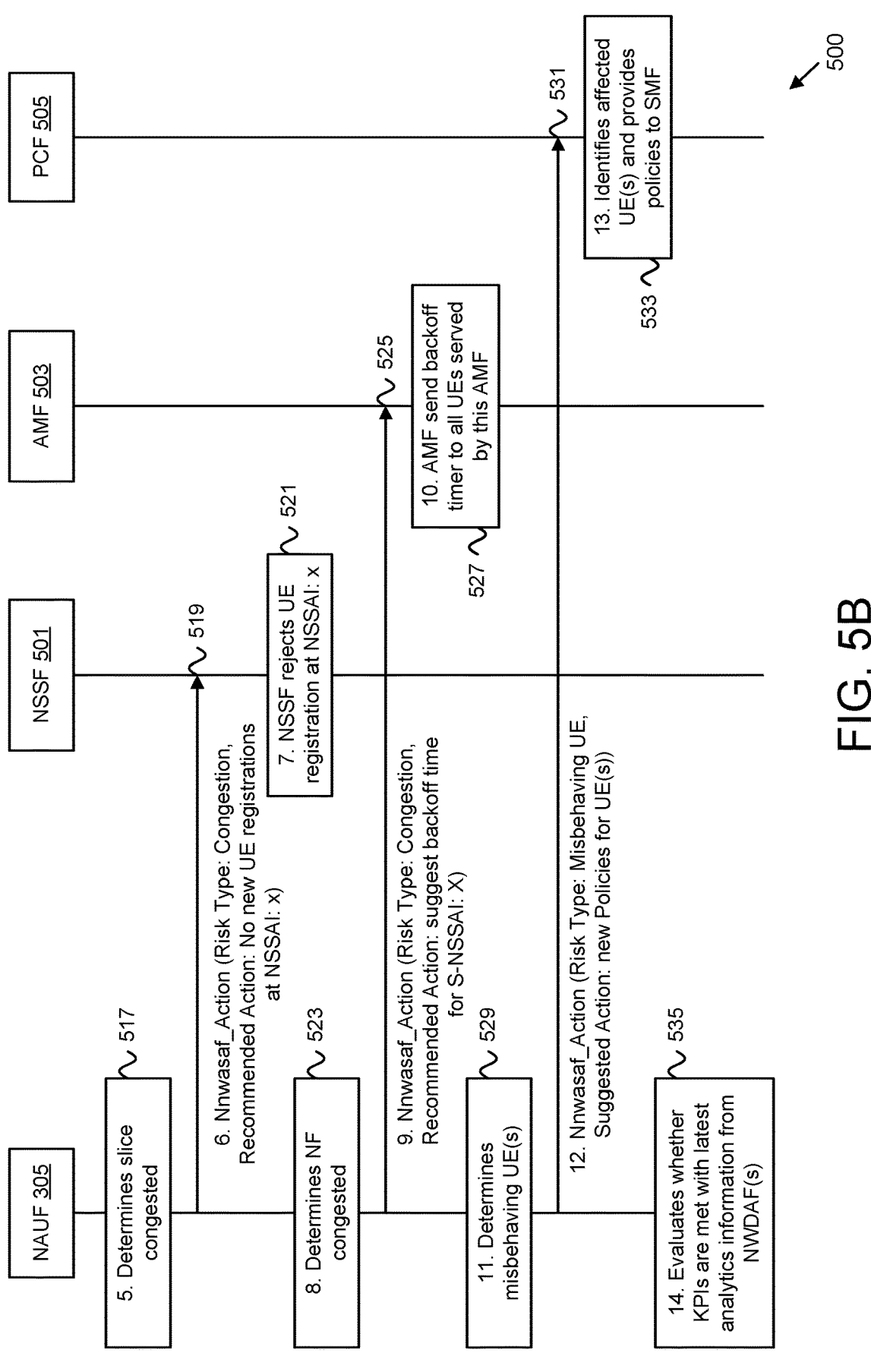
FIG. 5B is a continuation of the procedure depicted in FIG. 4A.

FIGS. 5A-5B depict a procedure 500 for optimizing service experience for a slice, according to embodiments of the disclosure. The procedure 500 involves a NAUF 305, at least one NWDAF 205, and one or more 5G NFs, depicted here as the NSSF 501, the AMF 315 and a PCF 325. The procedure 300 details signaling flow for a the NAUF 305 205 to provide prescriptive analytics that describe necessary actions of the 5G NFs for correcting identified issues.

The actions by the NAUF may be provided to each NF via a new service-based API. The service-based API can include information about the Risk by including a Risk Type attribute and the recommended action in the Action attribute.

The Risk Type attribute may include the following:

Slice Congestion indication

NF congestion indication

Misbehaving UEs

UEs experiencing congestion

User Plane Congestion

EAS server performance

The Action Attribute may include the following actions:

Stop accepting new UEs in a slice

Suggested backoff time for an AMF

Suggest new AM policies for misbehaving UE(s)

Suggest new RFSP policies for UE(s) experiencing congestion

Suggest new DNAI/UPF for a user plane connection

Suggest an optimal EAS server

The procedure 300 begins at Step 0 as the NAUF 305 is configured to identify risks and resolve issues for service experience for a slice (see block 507).

At Step 1, the NAUF 305 determines the Analytics required by one or more NWDAFs according to the configuration received in step 0 (see block 509).

At Step 2, the NAUF 305 sends a request to one or more NWDAFs 205 with the analytics required (see messaging 511).

At Step 3, the NWDAF(s) 205 provide the analytics requested (see messaging 513).

At Step 4, the NAUF 305 uses that analytics provided by the NWDAF(s) 205 as input data to its prescriptive engine and determines risks/issues with the network (see block 515).

Continuing on FIG. 5B, at Step 5, if the NAUF 305 identifies that the network slice is congested the NAUF determines action to resolve the issue (see block 517).

At Step 6, the NAUF 305 sends a recommendation action to the NSSF 501 to resolve the slice congestion (see messaging 519). Example actions include: reject new UE(s) registering to the slice (NSSAI=x), and indication of an AMF 503 being congested.

At Step 7, the NSSF 501 performs the recommendation action, e.g., reject UE registration at NSSAI=x (see block 521).

At Step 8, if the NAUF 305 identifies that an NF of a slice is congested, the NAUF 305 determines the NF to send the action (see block 523).

At Step 9, the NAUF 305 sends a recommended action to the AMF 503 to resolve the NF congestion (see messaging 525). Example actions include: configuring a backoff timer.

At Step 10, the AMF 503 performs the recommended action (see block 527).

At Step 11, if the NAUF 305 identifies misbehaving UEs, then the NAUF 305 determines the PCF 505 that serves these UEs (see block 529).

At Step 12, the NAUF 305 sends a recommended action to the PCF 505 including a list of UE(s) that are misbehaving (see messaging 531). The NAUF 305 may recommend new AM/SM and/or RFSP policies.

At Step 13, the PCF 505 sends updated policies to the misbehaving UEs (see block 533).

At Step 14, the NAUF 305 evaluates if the actions have resolved the issue by analyzing new analytics information from the NWDAF(s) 205 (see block 535).

In a second solution, the NAUF 305 may be configured by the network operator with a KPI goal ensuring that the service experience for one (or more) applications meets the KPI goal when a UE(s) application(s) traffic is routed to an edge network (i.e., the application is accessing services in an edge network via the 3GPP network).

Figure 6:
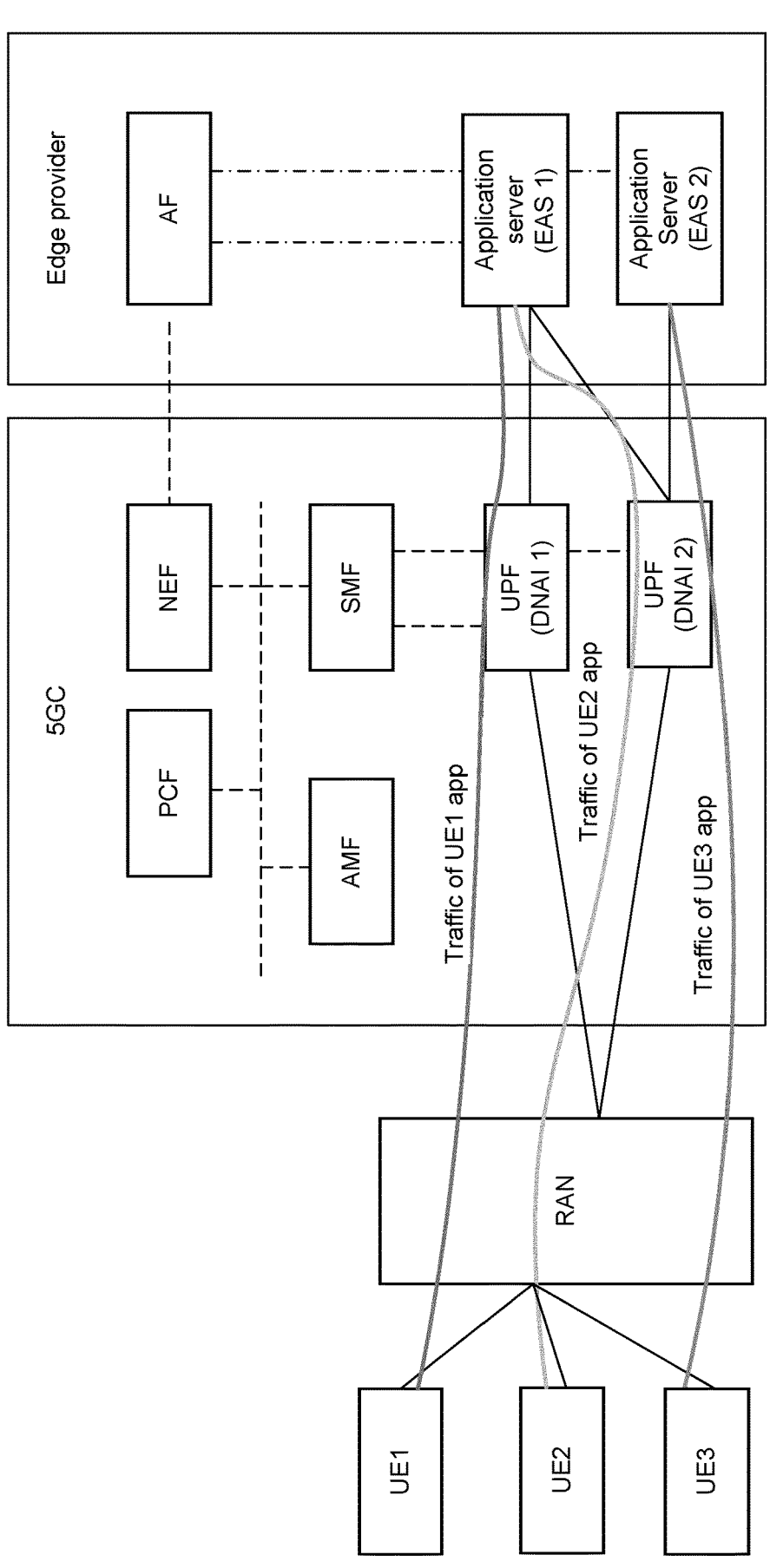
FIG. 6 is a diagram illustrating one embodiment of a network architecture for routing UE's traffic to an Edge Application Server via a DNAI path.

FIG. 6 depicts a network architecture including an RAN 610 that serves multiple UEs 605, a 5G core network 615 and an Edge provider 620. Application traffic of a UE 605 may be routed via different "DNAI paths" to an Edge Application Server ("EAS"), where each DNAI identifies a specific location in 3GPP network and is associated to a specific UPF.

In addition, there may be multiple Application servers at a DNAI location. As depicted, the first Edge Application Server 625 is associated to both DNAI 1 and DNAI 2 locations. Using analytics from the NWDAF, the NAUF can select the best DNAI path or the best Application Server at a UE or DNAI location.

To support the KPI goal, the NAUF 305 collects a first set of analytics from one or more NWDAFs 205. The NAUF 305 may subscribe to the first set of analytics from the NWDAFs 205. A first set of analytics may be the following: Service Experience analytics for an Application over one or more DNAIs to determine if the service experience meets the KPI goal(s). In one embodiment, the analytics may be as described in solution 31 of 3GPP TR 23.700-91. The target of analytics may be Any UE or a Group of UEs.

If the analytics information provided from the first set of analytics requested indicate that the service experience at a DNAI location does not meet the KPI goals the NAUF uses a prescriptive ML model to identify risks and determine actions. The NAUF may subscribe to the following second set of analytics from the NWDAF: A) NF load of SMF and UPF to determine whether an NF is overloaded; B) Real-time UPF, SMF load data from NRF; C) UE mobility analytics to determine UE mobility at DNAI location; and/or D) Analytics for misbehaving UEs to determines if there are any UEs introducing congestion at DNAI location.

If a risk is identified the determines an action and identify the NFs that will carry out such action, as described in Table 4:

TABLE 4

Potential recommended actions by NAUF based on second set of analytics

| Issue Identified | Recommended Action | Target NF |
|---|---|---|
| UPF load is high at a first DNAI location | Suggest an optimal DNAI path for UEs (NOTE 1) (NOTE 2) | SMF, AF |
| UPF load is high at a first DNAI location | Reduce QoS of UE(s) (NOTE 2) | PCF |
| Misbehaving UEs | new AM/SM policies blocking these UEs to access the network | PCF |

NOTE 1:
The NAUF determines optimal DNAI path based on collecting service experience analytics from multiple DNAI locations. How the NAUF knows which DNAI allows UE traffic to connect to the same Edge Application Server is not covered by this disclosure.
NOTE 2:
The NAUF is aware of UEs at DNAI location based on UE mobility analytics The NAUF 305 evaluates if the action had the required results by continuously evaluating the first set of analytics provided by one or more NWDAF 205. If the NAUF 305 determines that after a certain period of time (configurable at the NAUF by the network operator), the actions did not achieve the required results the NAUF may determine additional actions. The NAUF 305 may also update the ML model that the previously performed action did not achieve the required results. This will allow the NAUF 305 to determine which action provides the best result in meeting the KPIs configured at the NAUF 305.

The NAUF 350 may request a third set of analytics to determine new actions if none of the actions performed based on the second set of analytics had the required result. The NAUF 305 may subscribe to the third set of analytics from the NWDAF 205. A third set of analytics may include the following analytics: A) Analytics for Edge Application Server performance (e.g., as described in Solution 49 of 3GPP TR 23.700-91); and/or B) Real-time Edge Application Server performance data (e.g., as described in Table 6.49.2.2-1 of Solution 49 of 3GPP TR 23.700-91).

If the Analytics indicate that an EAS server performance is low (i.e., does not meet the KPIs set by the network operator) at the UE location the NAUF 305 can determine the following actions as described in Table 5.

TABLE 5

| Potential recommended actions by NAUF based on third set of analytics | | |
| --- | --- | --- |
| Issue Identified | Recommended Action | Target NF |
| EAS server performance | Suggest an optimal EAS server for UEs (NOTE 1) | AF |

NOTE 1:
The NAUF is aware of UEs at DNAI location based on UE mobility analytics In an alternative embodiment the NAUF may decide action based on real-time edge application server performance.

Similar to the behavior of the NAUF 305 after performing an action based on the second set of analytics, after the NAUF 305 has performed an action based on a third set of analytics, the NAUF 305 evaluates if the action had the required results by continuously evaluating the first set of analytics provided by one or more NWDAFs 205. The NAUF 305 may also update the ML model that the previously performed action did not achieve the required results. This will allow the NAUF 305 to determine which action provides the best result in meeting the KPIs configured at the NAUF 305.

In an alternative embodiment, the NAUF 305 may trigger the NWDAF(s) 205 to collect the second and third set analytics at the same time.

Figure 7A:
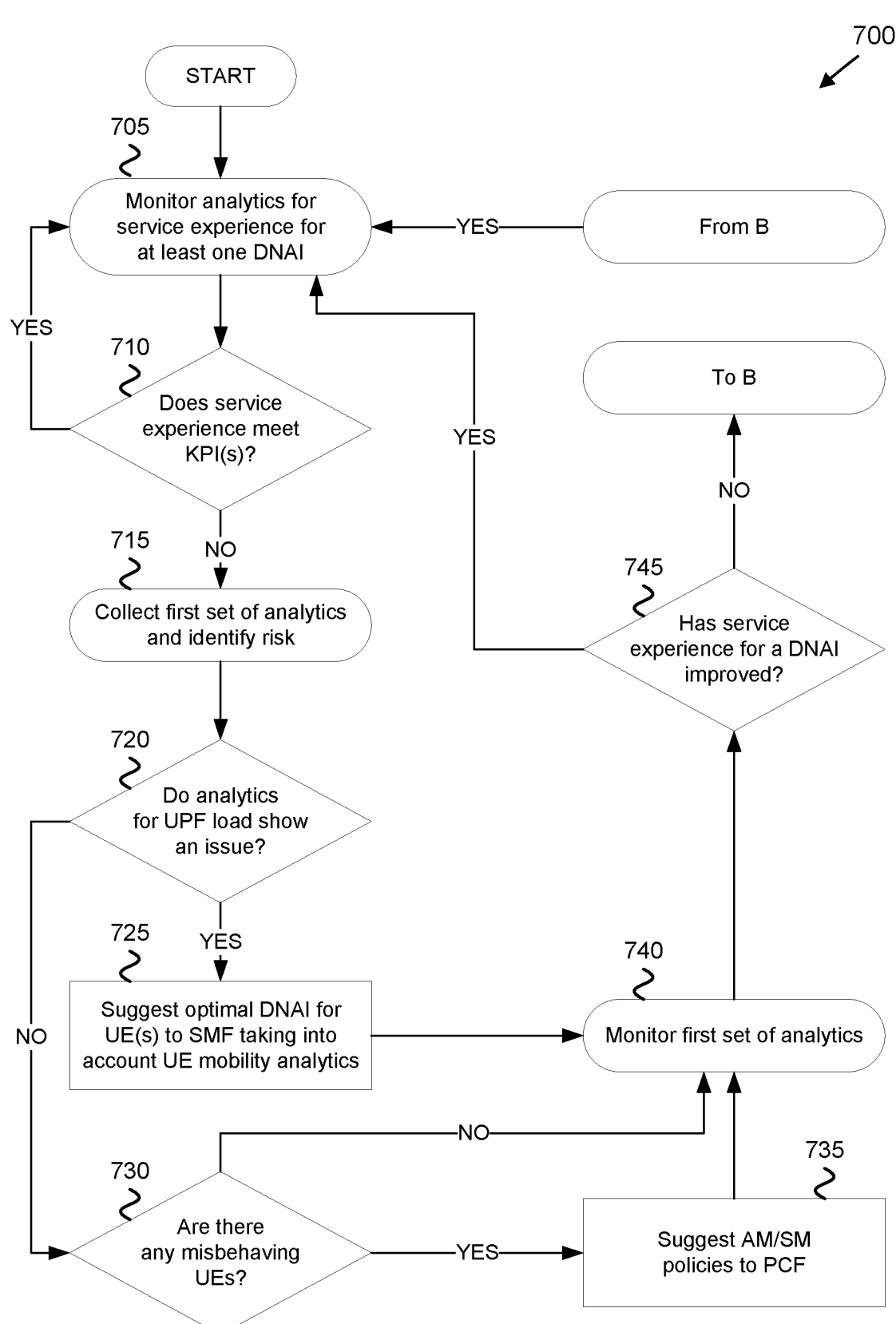
FIG. 7A is a flow diagram illustrating one embodiment of a NAUF procedure for optimizing service experience when UE is accessing services via an Edge network.
Figure 7B:
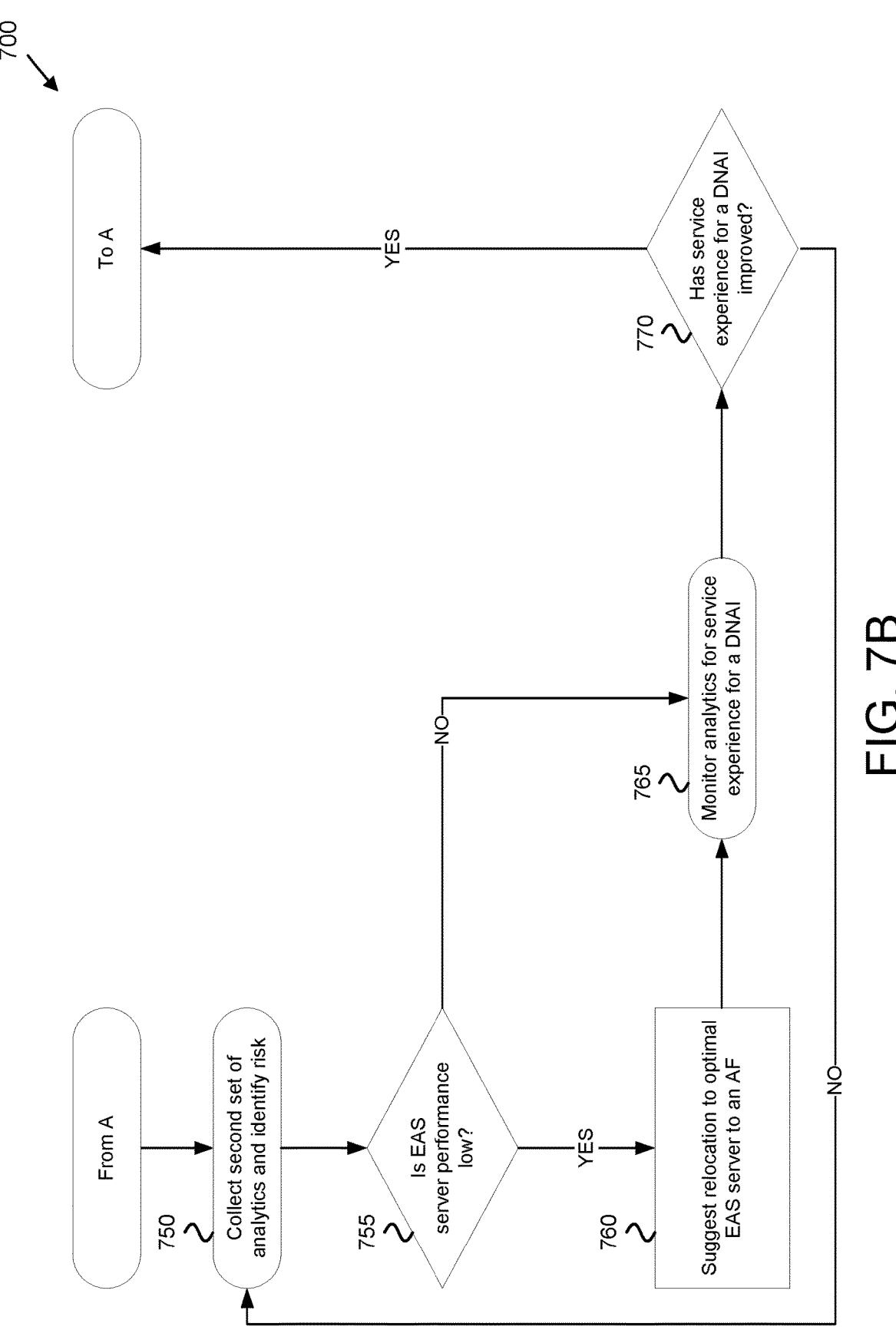
FIG. 7B is a continuation of the procedure depicted in FIG. 4A.
Figure 8A:
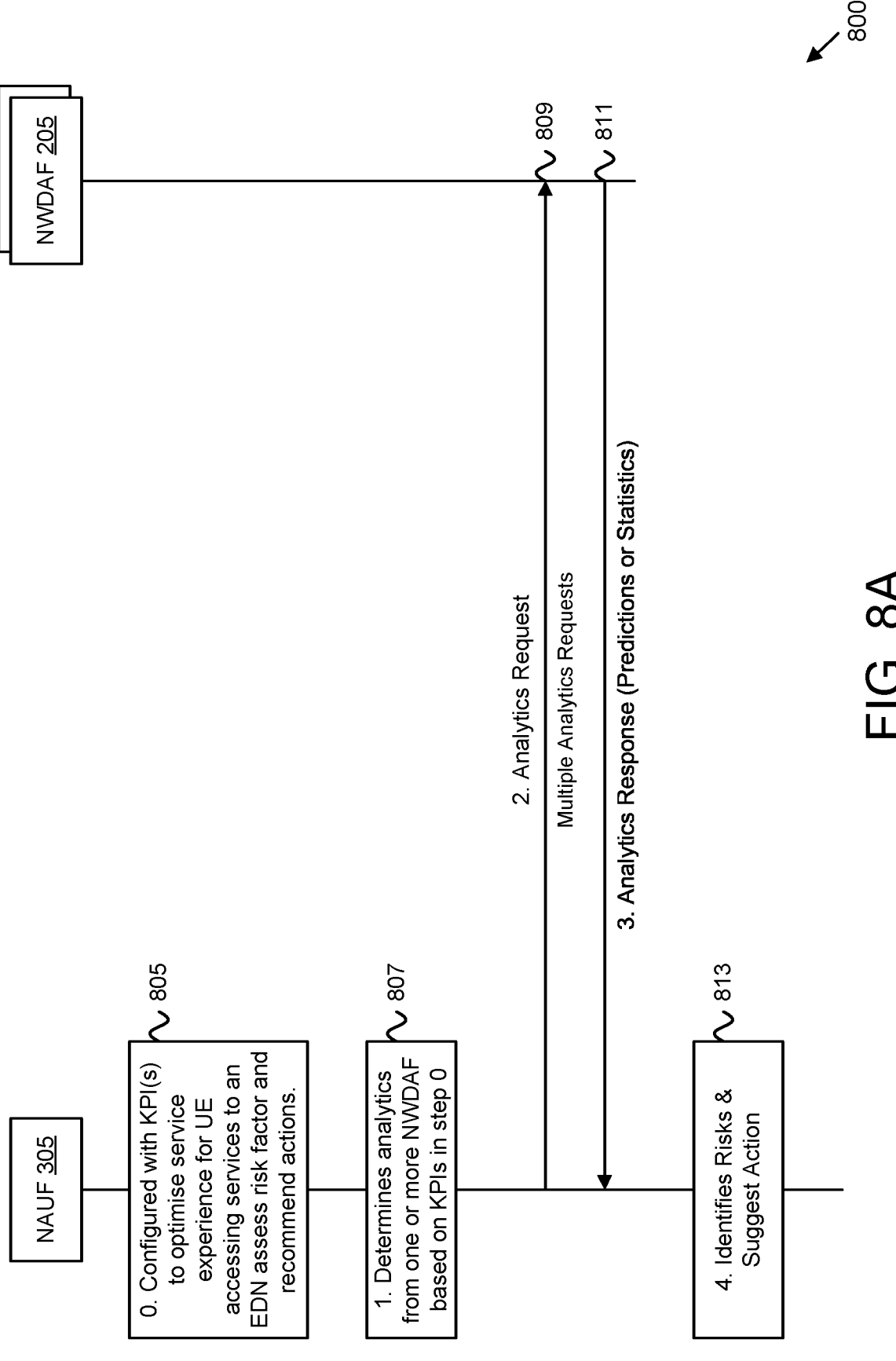
FIG. 8A is a signal flow diagram illustrating one embodiment of a procedure for optimizing service experience when UE is accessing services via an Edge network.
Figure 8B:
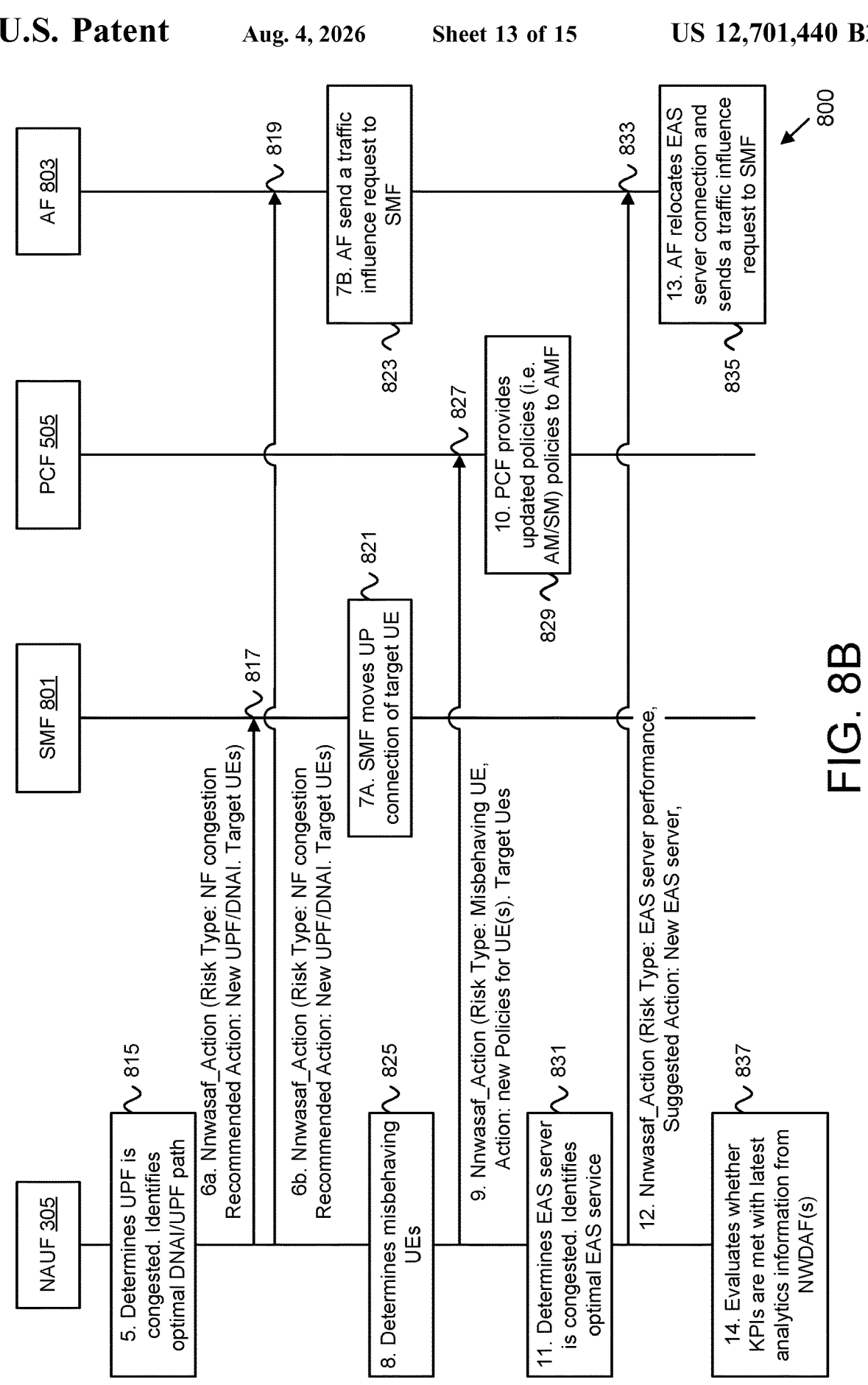
FIG. 8B is a continuation of the procedure depicted in FIG. 8A.

FIGS. 7A-7B depicts the overall procedure 700 for the NAUF 305 to identify issues, determine actions and evaluate if action had the required result. Starting at FIG. 7A, the procedure 700 starts and the NAUF 305 monitors analytics for service experience for at least one DNAI (see block 705). The NAUF 305 determines whether the service experience meets the KPIs (see decision point 710). If yes, then the NAUF 305 continues to monitor analytics for service experience (see block 705). Otherwise, if no, then the NAUF 305 collects a first set of analytics and identifies risk (see block 715). The NAUF 305 determines whether analytics for UPF load show an issue (see decision point 720). If yes, then the NAUF 305 suggests to the SMF an optimal DNAI/UPF for UE(s), taking into account UE mobility analytics (see block 725) and monitors the first set analytics (see block 740). If no, the NAUF 305 determines whether there are any misbehaving UEs (see block 730). If yes, then the NAUF 305 suggests Access Management and/or Session Management policies to the PCF (see block 735) and monitors the first set analytics (see block 740). If no, the NAUF 305 monitors the first set analytics (see block 740). The NAUF 305 determines whether service experience for a DNAI has improved (see decision point 745). If yes, then the NAUF 305 continues to monitor analytics for service experience (see block 705).

Continuing on FIG. 4B, if the NAUF 305 determines that service experience for a DNAI has not improved (from decision point 745), then the NAUF 305 collects a second set of analytics and identifies risk (see block 750). The NAUF 305 determines whether EAS server performance is low (see block 755). If yes, then the NAUF 305 suggests relocation to an optimal EAS server to an AF (see block 460) and monitors analytics for the service experience for a DNAI (see block 765). If no, the NAUF 305 monitors analytics for the service experience for a DNAI (see block 765). The NAUF 305 determines whether service experience for a DNAI has improved (see decision point 770). If yes, then the NAUF 305 continues to monitor analytics for service experience (see block 705). If no, the NAUF 305 continues to collect a second set of analytics and identifies risk (see block 750).

The actions by the NAUF may be provided to each NF via a new service-based API. The service-based API can include information about the Risk by including a Risk Type attribute and the recommended action in the Action attribute.

The Risk Type attribute may include the following:
Slice Congestion indication
NF congestion indication
Misbehaving UEs
UEs experiencing congestion
User Plane Congestion
The Action Attribute may include the following actions:
Stop accepting new UEs in a slice
Suggested backoff time for an AMF
Suggest new AM policies for misbehaving UE(s)
Suggest new RFSP policies for UE(s) experiencing congestion
Suggest new DNAI/UPF for a user plane connection
Suggest an optimal EAS server
An example procedure 800 for the NAUF 305 to provide actions to one or more NF(s) to optimize service experience for a user plane connection when the UE is accessing services to an Edge Network is described below:

At Step 0, the NAUF 305 is configured to identify risks and resolve issues for service experience for UEs accessing services to an Edge network (see block 805).

At Step 1, determines the Analytics required by one or more NWDAFs 205 according to the configuration received in step 0 (see block 807).

At Step 2, sends a request to one or more NWDAFs 205 with the analytics required (see messaging 809).

At Step 3, the NWDAF(s) 205 provide the analytics requested (see messaging 811).

At Step 4, the NAUF 305 uses that analytics provided by the NWDAF(s) 205 as input data to its prescriptive engine and determines risks/issues with the network (see block 813).

At Step 5, if the NAUF identifies that a UPF that provides connectivity to an edge network according to a DNAI is congested the NAUF determines the optimal UPF/ DNAI path as described above (see block 815).

Note that either steps 6a and 7a or steps 6b and 7b are carried out:

At Step 6a, the NAUF 305 sends a recommended action to the SMF 801 for optimal UPF/DNAI path (see messaging 817). Optionally a list of UEs is included if the NAUF 305 considers UE mobility analytics within the DNAI area.

Alternatively, at Step 6b, the NAUF 305 sends a recommended action to the AF 803 for optimal DNAI selection (see messaging 819). Optionally a list of UEs is included if the NAUF 305 considers UE mobility analytics within the DNAI area.

At Step 7a, the SMF 801 performs the recommended action (see block 821).

Alternatively, at Step 7b, the AF 803 performs the recommended action (see block 823)

At Step 8, if the NAUF 305 identifies misbehaving UEs, as described above, then the NAUF 305 determines the PCF 505 that serves these UEs (see block 825).

At Step 9, the NAUF 305 sends a recommended action to the PCF 505 including a list of UE(s) that are misbehaving (see messaging 827). The NAUF 305 may recommend new AM/SM and/or RFSP policies.

At Step 10, the PCF 505 sends updated policies to the misbehaving UEs (see block 829).

At Step 11, if the NAUF 305 identifies that the EAS server performance is low, then the NAUF 305 determines an optimal EAS server based on analytics received in step 1 (see block 831).

At Step 12, the NAUF 305 sends a recommended action to the AF 803 including an optimal EAS server (see messaging 833).

At Step 13, the AF 803 relocates the EAS server and provides updated traffic influence request to the SMF 801 (see block 835). Note that how the AF 803 relocates the EAS server not covered in this disclosure.

At Step 14, the NAUF 305 evaluates if the actions have resolved the issue by analyzing new analytics information from the NWDAFs 205 (see block 837).

Figure 9:
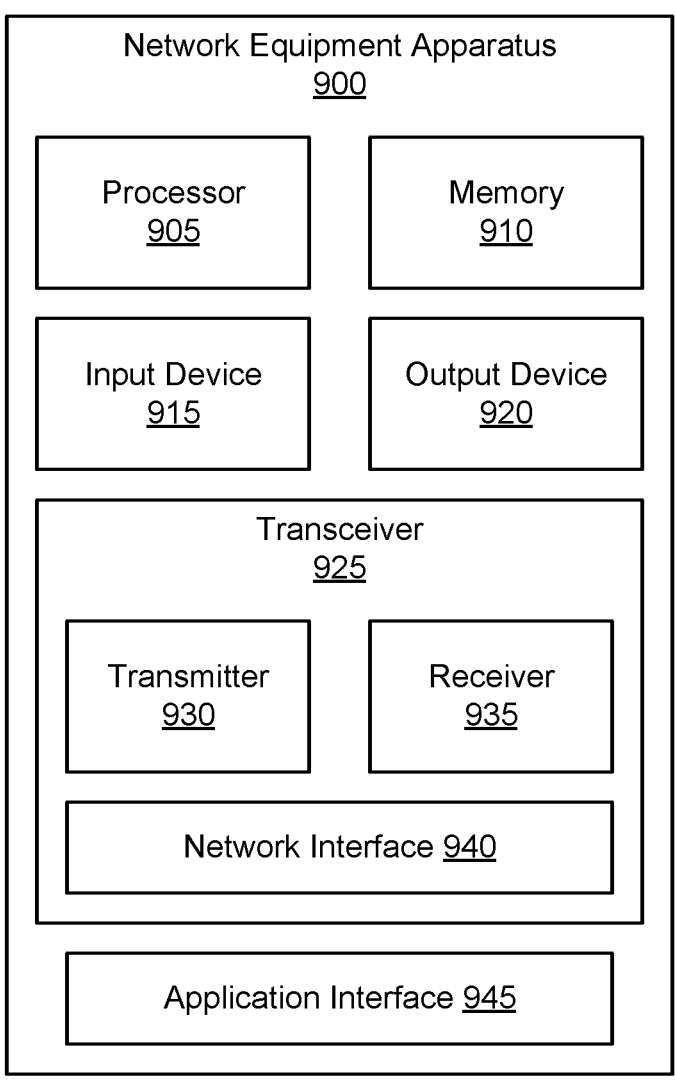
FIG. 9 is a block diagram illustrating one embodiment of a network equipment apparatus.

FIG. 9 depicts one embodiment of a network equipment apparatus 900 that may be used for determining an action for a network function based on network analytics, according to embodiments of the disclosure. In some embodiments, the network equipment apparatus 900 may be one embodiment of a central data analytics function or a network automation function, such as the NAUF 136 and/or the NAUF 305. Furthermore, network equipment apparatus 900 may include a processor 905, a memory 910, an input device 915, an output device 920, a transceiver 925.

In some embodiments, the input device 915 and the output device 920 are combined into a single device, such as a touch screen. In certain embodiments, the network equipment apparatus 900 does not include any input device 915 and/or output device 920. In various embodiments, the network equipment apparatus 900 may include one or more of: the processor 905, the memory 910, and the transceiver 925, and does not include the input device 915 and/or the output device 920.

As depicted, the transceiver 925 includes at least one transmitter 930 and at least one receiver 935. Here, the transceiver 925 communicates with one or more network functions in the mobile communication network (e.g., PLMN). Additionally, the transceiver 925 may support at least one network interface 940 and/or application interface 945. The application interface(s) 945 may support one or more APIs. The network interface(s) 940 may support 3GPP reference points, such as the N23 reference point. Other network interfaces 940 may be supported, as understood by one of ordinary skill in the art. In some embodiments, the transceiver 925 supports different interfaces 940 for communicating with the various network functions in a mobile core network (e.g., a 5GC).

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the processor 905 controls the network equipment apparatus 900 to implement the above described NAUF behaviors. For example, via the network interface 940, the processor 905 that receives a first set of analytics from at least one network analytics function in the mobile communication network, the first set of analytics relating to a first KPI. The processor 905 determines from the first set of analytics whether a first condition is met and determines a first set of actions when the first condition is not met. Via the network interface 940, the processor 905 sends each action in the first set of actions to an associated network function in the mobile communication network.

In some embodiments, the first key performance indicator relates to fulfilling a service experience KPI for a slice or fulfilling a service experience KPI when user plane traffic of applications of one or more UEs is routed to an Edge Application Server in an edge network via the mobile communication network. In some embodiments, the first set of analytics corresponds to one or more of: a service experience of a network slice and a service experience for an application over one or more DNAIs.

In some embodiments, receiving the first set of analytics occurs in response to requesting analytics from the at least one network analytics function, said analytics being requested based on the first KPI. The first set of analytics may be determined by the network function based on the first KPI. In some embodiments, the first condition is met when a value for the first KPI is within a predetermined range, said value determined from the first set of analytics. For example, the condition may be "first KPI<high threshold." As another example, the condition may be "low threshold<first KPI<high threshold."

In some embodiments, determining the first set of actions comprises obtaining a second set of analytics based on the first KPI not met and selecting a first set of actions based on the second set of analytics. The second set of analytics may be explanatory analytics, i.e., analytics explaining why the condition is not met. In various embodiments, the first set of actions comprises one or more of: forbidding new UE registrations at a network slice, forbidding selection of an overloaded AMF, configuring a backoff timer for the overloaded AMF, a policy recommendation, and a data path recommendation.

In certain embodiments, a policy recommendation may include sending new RFSP rules for one or more UE based on identifying UEs experiencing congestion or based on identifying UEs contributing to an increased load in the network identified via the second set of analytics. In certain embodiments, a policy recommendation may include sending new Access and Mobility policies for one or more UEs based on identifying misbehaving UEs or based on identifying UEs contributing to an increased load in a network identified via the second set of analytics. In certain embodiments, a data path recommendation may include suggesting new DNAI/UPF for a user plane connection of one or more UEs to an SMF/AF or suggesting a new optimal application server in an edge network to AMF based on the second set of analytics.

In some embodiments, the at least one network function comprises one or more of: an access management function (e.g., AMF), a mobility management function (e.g., AMF), a SMF, a PCF, a NSSF, and an AF. In some embodiments, the processor 905 continues to monitor whether the first condition is met according to the first KPI by monitoring the first set of analytics corresponding to the first KPI after sending the first set of actions. In such embodiments, the processor 905 may also create a second set of actions in response to the first condition not being met after a first time period from the sending of the first set of actions and sending each action in the second set of actions to an associated network function in the mobile communication network.

In some embodiments, creating the second set of actions comprises requesting a third set of analytics based on the first KPI and selecting the second set of actions using the third set of analytics. In such embodiments, the second set of actions comprises one or more of: forbidding new UE registrations at a network slice, forbidding selection of an overloaded AMF, configuring a backoff timer for the overloaded AMF, a policy recommendation, and a data path recommendation.

In certain embodiments, a policy recommendation may include sending new RFSP rules for one or more UE based on identifying UEs experiencing congestion or based on identifying UEs contributing to an increased load in the network identified via the third set of analytics. In certain embodiments, a policy recommendation may include sending new Access and Mobility policies for one or more UEs based on identifying misbehaving UEs or based on identifying UEs contributing to an increased load in a network identified via the third set of analytics. In certain embodiments, a data path recommendation may include suggesting new DNAI and/or UPF for a user plane connection of one or more UEs to an SMF and/or AF or suggesting a new optimal application server in an edge network to AMF based on the third set of analytics.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media. In some embodiments, the memory 910 stores data relating to determining an action for a network function based on network analytics, for example storing ML models, training data, Analytics IDs, lists of Events to monitor, occurrence of Events, Event filters, monitoring/reporting subscriptions, subscription targets, subscription IDs, NF profiles, and the like. In certain embodiments, the memory 910 also stores program code and related data, such as an operating system ("OS") or other controller algorithms operating on the network equipment apparatus 900 and one or more software applications.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, may include any known electronically controllable display or display device. The output device 920 may be designed to output visual, audible, and/or haptic signals. In some embodiments, the output device 920 includes an electronic display capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, all or portions of the output device 920 may be located near the input device 915.

As discussed above, the transceiver 925 may communicate with one or more remote units and/or with one or more interworking functions that provide access to one or more PLMNs. The transceiver 925 may also communicate with one or more network functions (e.g., in the mobile core network 130). The transceiver 925 operates under the control of the processor 905 to transmit messages, data, and other signals and also to receive messages, data, and other signals. For example, the processor 905 may selectively activate the transceiver (or portions thereof) at particular times in order to send and receive messages.

The transceiver 925 may include one or more transmitters 930 and one or more receivers 935. In certain embodiments, the one or more transmitters 930 and/or the one or more receivers 935 may share transceiver hardware and/or circuitry. For example, the one or more transmitters 930 and/or the one or more receivers 935 may share antenna(s), antenna tuner(s), amplifier(s), filter(s), oscillator(s), mixer(s), modulator/demodulator(s), power supply, and the like. In one embodiment, the transceiver 925 implements multiple logical transceivers using different communication protocols or protocol stacks, while using common physical hardware.

Figure 10:
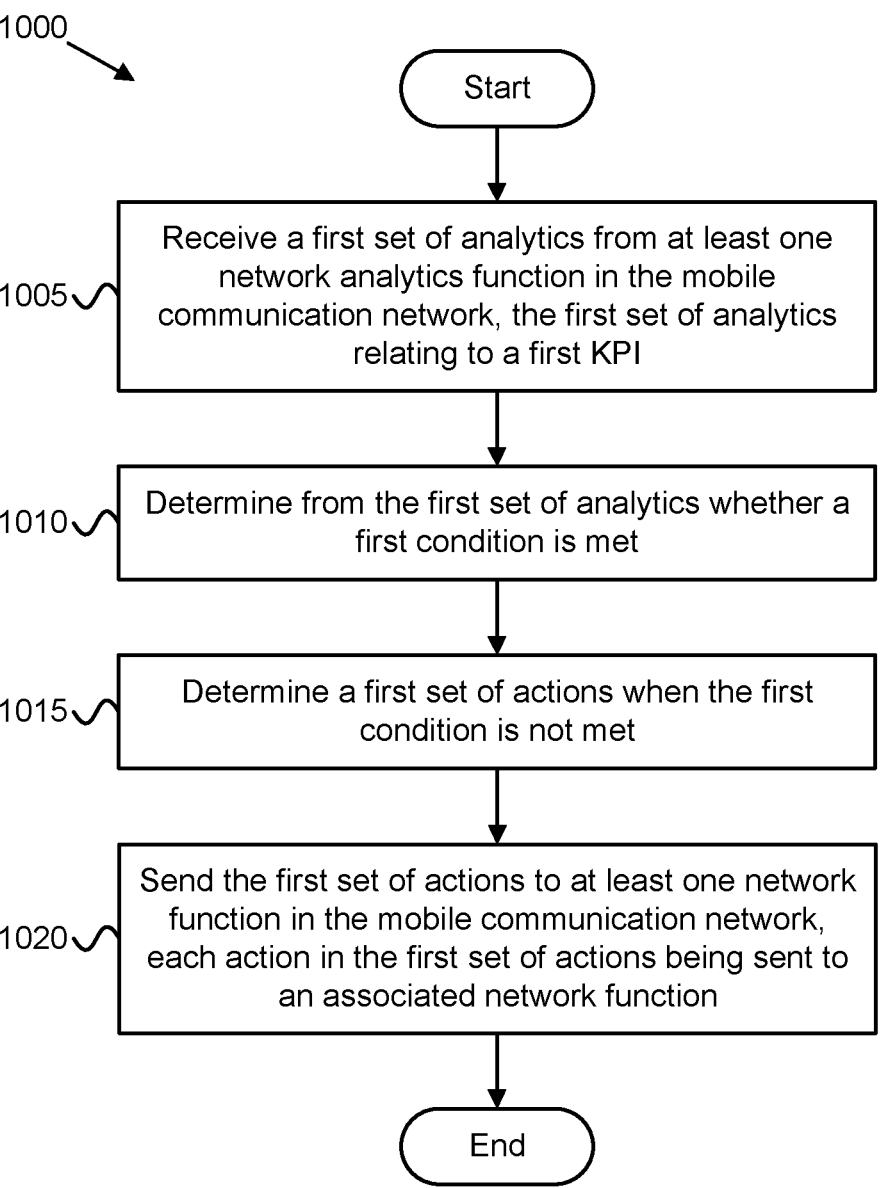
FIG. 10 is a flow chart diagram illustrating one embodiment of a method for determining an action for a network function based on network analytics.

FIG. 10 depicts one embodiment of a method 1000 for determining an action for a network function based on network analytics, according to embodiments of the disclosure. In various embodiments, the method 1000 is performed by a network automation function, such as the NAUF 136, the NAUF 305, and/or the network equipment apparatus 900, described above. In some embodiments, the method 1000 is performed by a processor, such as a microcontroller, a microprocessor, a CPU, a GPU, an auxiliary processing unit, a FPGA, or the like.

The method 1000 begins and receives 1005 a first set of analytics from at least one network analytics function in the mobile communication network, the first set of analytics relating to a first KPI. The method 1000 includes determining 1010 from the first set of analytics whether a first condition is met. The method 1000 includes determining 1015 a first set of actions when the first condition is not met. The method 1000 includes sending 1020 the first set of actions to at least one network function in the mobile communication network, each action in the first set of actions being sent to an associated network function. The method 1000 ends.

Disclosed herein is a first apparatus for determining an action for a network function based on network analytics, according to embodiments of the disclosure. The first apparatus may be implemented by a network automation function, such as the NAUF 136, the NAUF 305, and/or the network apparatus 600. The first apparatus includes a network interface that communicates with a mobile communication network and a processor that receives a first set of analytics from at least one network analytics function in the mobile communication network, the first set of analytics relating to a first KPI. The processor determines from the first set of analytics whether a first condition is met and determines a first set of actions when the first condition is not met. Via the network interface, the processor sends each action in the first set of actions to an associated network function in the mobile communication network.

In some embodiments, the first key performance indicator relates to fulfilling a service experience KPI for a slice or fulfilling a service experience KPI when user plane traffic of applications of one or more UEs is routed to an Edge Application Server in an edge network via the mobile communication network. In some embodiments, the first set of analytics corresponds to one or more of: a service experience of a network slice and a service experience for an application over one or more DNAIs.

In some embodiments, receiving the first set of analytics occurs in response to requesting analytics from the at least one network analytics function, said analytics being requested based on the first KPI. The first set of analytics may be determined by the network function based on the first KPI. In some embodiments, the first condition is met when a value for the first KPI is within a predetermined range, said value determined from the first set of analytics. For example, the condition may be "first KPI<high threshold." As another example, the condition may be "low threshold<first KPI<high threshold."

In some embodiments, determining the first set of actions comprises obtaining a second set of analytics based on the first KPI not met and selecting a first set of actions based on the second set of analytics. The second set of analytics may be explanatory analytics, i.e., analytics explaining why the condition is not met. In various embodiments, the first set of actions comprises one or more of: forbidding new UE registrations at a network slice, forbidding selection of an overloaded AMF, configuring a backoff timer for the overloaded AMF, a policy recommendation, and a data path recommendation.

In certain embodiments, a policy recommendation may include sending new RFSP rules for one or more UE based on identifying UEs experiencing congestion or based on identifying UEs contributing to an increased load in the network identified via the second set of analytics. In certain embodiments, a policy recommendation may include sending new Access and Mobility policies for one or more UEs based on identifying misbehaving UEs or based on identifying UEs contributing to an increased load in a network identified via the second set of analytics. In certain embodiments, a data path recommendation may include suggesting new DNAI/UPF for a user plane connection of one or more UEs to an SMF/AF or suggesting a new optimal application server in an edge network to AMF based on the second set of analytics.

In some embodiments, the at least one network function comprises one or more of: an access management function (e.g., AMF), a mobility management function (e.g., AMF), a SMF, a PCF, a NSSF, and an AF. In some embodiments, the processor continues to monitor whether the first condition is met according to the first KPI by monitoring the first set of analytics corresponding to the first KPI after sending the first set of actions. In such embodiments, the processor may also create a second set of actions in response to the first condition not being met after a first time period from the sending of the first set of actions and sending each action in the second set of actions to an associated network function in the mobile communication network.

In some embodiments, creating the second set of actions comprises requesting a third set of analytics based on the first KPI and selecting the second set of actions using the third set of analytics. In such embodiments, the second set of actions comprises one or more of: forbidding new UE registrations at a network slice, forbidding selection of an overloaded AMF, configuring a backoff timer for the overloaded AMF, a policy recommendation, and a data path recommendation.

In certain embodiments, a policy recommendation may include sending new RFSP rules for one or more UE based on identifying UEs experiencing congestion or based on identifying UEs contributing to an increased load in the network identified via the third set of analytics. In certain embodiments, a policy recommendation may include sending new Access and Mobility policies for one or more UEs based on identifying misbehaving UEs or based on identifying UEs contributing to an increased load in a network identified via the third set of analytics. In certain embodiments, a data path recommendation may include suggesting new DNAI/UPF for a user plane connection of one or more UEs to an SMF/AF or suggesting a new optimal application server in an edge network to AMF based on the third set of analytics.

Disclosed herein is a first method for determining an action for a network function based on network analytics, according to embodiments of the disclosure. The first method may be performed by a network automation function in a mobile communication network, such as the NAUF 136, the NAUF 305, and/or the network apparatus 600. The first method includes receiving a first set of analytics from at least one network analytics function in the mobile communication network, the first set of analytics relating to a first KPI. The first method includes determining from the first set of analytics whether a first condition is met and determining a first set of actions when the first condition is not met. The first method includes sending the first set of actions to at least one network function in the mobile communication network, each action in the first set of actions being sent to an associated network function.

In some embodiments, the first key performance indicator relates to fulfilling a service experience KPI for a slice or fulfilling a service experience KPI when user plane traffic of applications of one or more UEs is routed to an Edge Application Server in an edge network via the mobile communication network. In some embodiments, the first set of analytics corresponds to one or more of: a service experience of a network slice and a service experience for an application over one or more DNAIs.

In some embodiments, receiving the first set of analytics occurs in response to requesting analytics from the at least one network analytics function, said analytics being requested based on the first KPI. The first set of analytics may be determined by the network function based on the first KPI. In some embodiments, the first condition is met when a value for the first KPI is within a predetermined range, said value determined from the first set of analytics. For example, the condition may be "first KPI<high threshold." As another example, the condition may be "low threshold<first KPI<high threshold."

In some embodiments, determining the first set of actions comprises obtaining a second set of analytics based on the first KPI not met and selecting a first set of actions based on the second set of analytics. The second set of analytics may be explanatory analytics, i.e., analytics explaining why the condition is not met. In various embodiments, the first set of actions comprises one or more of: forbidding new UE registrations at a network slice, forbidding selection of an overloaded AMF, configuring a backoff timer for the overloaded AMF, a policy recommendation, and a data path recommendation.

In certain embodiments, a policy recommendation may include sending new RFSP rules for one or more UE based on identifying UEs experiencing congestion or based on identifying UEs contributing to an increased load in the network identified via the second set of analytics. In certain embodiments, a policy recommendation may include sending new Access and Mobility policies for one or more UEs based on identifying misbehaving UEs or based on identifying UEs contributing to an increased load in a network identified via the second set of analytics. In certain embodiments, a data path recommendation may include suggesting new DNAI/UPF for a user plane connection of one or more UEs to an SMF/AF or suggesting a new optimal application server in an edge network to AMF based on the second set of analytics.

In some embodiments, the at least one network function comprises one or more of: an access management function (e.g., AMF), a mobility management function (e.g., AMF), a SMF, a PCF, a NSSF, and an AF. In some embodiments, the first method includes continuing to monitor whether the first condition is met according to the first KPI by monitoring the first set of analytics corresponding to the first KPI after sending the first set of actions. In such embodiments, the first method may also include creating a second set of actions in response to the first condition not being met after a first time period from the sending of the first set of actions and sending each action in the second set of actions to an associated network function in the mobile communication network.

In some embodiments, creating the second set of actions comprises requesting a third set of analytics based on the first KPI and selecting the second set of actions using the third set of analytics. In such embodiments, the second set of actions comprises one or more of: forbidding new UE registrations at a network slice, forbidding selection of an overloaded AMF, configuring a backoff timer for the overloaded AMF, a policy recommendation, and a data path recommendation.

In certain embodiments, a policy recommendation may include sending new RFSP rules for one or more UE based on identifying UEs experiencing congestion or based on identifying UEs contributing to an increased load in the network identified via the third set of analytics. In certain embodiments, a policy recommendation may include sending new Access and Mobility policies for one or more UEs based on identifying misbehaving UEs or based on identifying UEs contributing to an increased load in a network identified via the third set of analytics. In certain embodiments, a data path recommendation may include suggesting new DNAI/UPF for a user plane connection of one or more UEs to an SMF/AF or suggesting a new optimal application server in an edge network to AMF based on the third set of analytics.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a network function, the method comprising:

receiving a first set of analytics from at least one network analytics function in a mobile communication network, the first set of analytics relating to a first key performance indicator ("KPI");

determining from the first set of analytics whether a first condition is met;

determining a first set of actions when the first condition is not met;

transmitting the first set of actions to at least one network function in the mobile communication network, wherein each action in the first set of actions is transmitted to an associated network function;

creating a second set of actions in response to the first condition not being met after a first time period from the transmitting of the first set of actions; and transmitting the second set of actions to the at least one network function, wherein each action in the second set of actions is transmitted to an associated network function.

2. The method of claim 1, wherein the first KPI relates to fulfilling a service experience KPI for a slice or fulfilling a service experience KPI when user plane traffic of applications of one or more user equipments ("UEs") is routed to an Edge Application Server in an edge network via the mobile communication network.

3. The method of claim 1, wherein the first set of analytics corresponds to one or more of: a service experience of a network slice, or a service experience for an application over one or more data network access identifiers.

4. The method of claim 1, wherein receiving the first set of analytics occurs in response to requesting analytics from the at least one network analytics function, said analytics being requested based on the first KPI.

5. The method of claim 1, wherein the first condition is met when a value for the first KPI is within a predetermined range, the value determined from the first set of analytics.

6. The method of claim 1, wherein determining the first set of actions comprises obtaining a second set of analytics based on the first KPI not being met and selecting the first set of actions based on the second set of analytics.

7. The method of claim 1, wherein the first set of actions comprises one or more of: forbidding new user equipment ("UE") registrations at a network slice, forbidding selection of an overloaded access and mobility management function ("AMF"), configuring a backoff timer for the overloaded AMF, a policy recommendation, and a data path recommendation.

8. The method of claim 7, wherein the policy recommendation comprises transmitting new Radio access technology and/or Frequency Selection Policy ("RFSP") rules for one or more UEs based on identifying UEs experiencing congestion or based on identifying UEs contributing to an increased load in the network identified via a second set of analytics.

9. The method of claim 7, wherein the policy recommendation comprises transmitting new Access and Mobility policies for one or more UEs based on identifying misbehaving UEs or based on identifying UEs contributing to an increased load in a network identified via a second set of analytics.

10. The method of claim 7, wherein the data path recommendation comprises suggesting new Data Network Access Identifier and/or User Plane Function ("DNAI/UPF") for a user plane connection of one or more UEs to a session management function and/or application function ("SMF/AF") or suggesting a new optimal application server in an edge network to AMF based on a second set of analytics.

11. The method of claim 1, wherein the at least one network function comprises one or more of: an access management function, a mobility management function, a session management function, a policy control function, a network slice selection function, and an application function.

12. The method of claim 1, further comprising continuing to monitor whether the first condition is met according to the first KPI by monitoring the first set of analytics corresponding to the first KPI after transmitting the first set of actions.

13. The method of claim 1, wherein creating the second set of actions comprises requesting a second set of analytics based on the first KPI and selecting the second set of actions using the second set of analytics.

14. The method of claim 13, wherein the second set of actions comprises one or more of: forbidding new user equipment ("UE") registrations at a network slice, forbidding selection of an overloaded access and mobility management function ("AMF"), configuring a backoff timer for the overloaded AMF, a policy recommendation, and a data path recommendation.

15. The method of claim 14, wherein the policy recommendation comprises transmitting new Radio access technology and/or Frequency Selection Policy ("RFSP") rules for one or more UEs based on identifying UEs experiencing congestion or based on identifying UEs contributing to an increased load in the network identified via the second set of analytics.

16. The method of claim 14, wherein the policy recommendation comprises transmitting new Access and Mobility policies for one or more UEs based on identifying misbehaving UEs or based on identifying UEs contributing to an increased load in a network identified via the second set of analytics.

17. The method of claim 14, wherein the data path recommendation comprises suggesting new Data Network Access Identifier and/or User Plane Function ("DNAI/UPF") for a user plane connection of one or more UEs to an session management function and/or application function ("SMF/AF") or suggesting a new optimal application server in an edge network to AMF based on the second set of analytics.

18. A network function apparatus for wireless communication, comprising:
  at least one memory; and
  at least one processor coupled with the at least one memory and configured to cause the network function apparatus to:
  receive a first set of analytics from at least one network analytics function in a mobile communication network, the first set of analytics relating to a first key performance indicator ("KPI");
  determine determines-from the first set of analytics whether a first condition is met;
  determine a first set of actions when the first condition is not met;
  transmit the first set of actions to at least one network function in the mobile communication network, wherein sends each action in the first set of actions is transmitted to an associated network function;
  create a second set of actions in response to the first condition not being met after a first time period from the transmitting of the first set of actions; and
  transmit the second set of actions to the at least one network function, wherein each action in the second set of actions is transmitted to an associated network function.

19. The network function apparatus of claim 18, wherein the first KPI relates to fulfilling a service experience KPI for a slice or fulfilling a service experience KPI when user plane traffic of applications of one or more user equipments ("UEs") is routed to an Edge Application Server in an edge network via the mobile communication network.

20. The network function apparatus of claim 18, wherein the first set of actions comprises one or more of: forbidding new user equipment ("UE") registrations at a network slice, forbidding selection of an overloaded access and mobility management function ("AMF"), configuring a backoff timer for the overloaded AMF, a policy recommendation, and a data path recommendation.

* * * * *